United States Patent
Kirchofer et al.

(10) Patent No.: US 7,009,557 B2
(45) Date of Patent: Mar. 7, 2006

(54) INTERFERENCE REJECTION GPS ANTENNA SYSTEM

(75) Inventors: Richard Kirchofer, Cocoa, FL (US); Raymond Nielsen, Orlando, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/902,095

(22) Filed: Jul. 11, 2001

(65) Prior Publication Data

US 2003/0011514 A1 Jan. 16, 2003

(51) Int. Cl.
*H01Q 3/00* (2006.01)

(52) U.S. Cl. ............ 342/359; 342/357.08; 342/357.14; 342/372

(58) Field of Classification Search ................ 342/359, 342/357.06, 357.08, 357.11, 357.14
See application file for complete search history.

(56) References Cited

U.S. PATENT DOCUMENTS

| | | |
|---|---|---|
| 3,646,558 A | 2/1972 | Campanella |
| 5,021,792 A | 6/1991 | Hwang |
| 5,181,025 A | 1/1993 | Ferguson et al. |
| 5,187,487 A | 2/1993 | Riza |
| 5,191,339 A | 3/1993 | Riza |
| 5,210,541 A | 5/1993 | Hall et al. |
| 5,231,406 A | 7/1993 | Sreenivas |
| 5,402,347 A | 3/1995 | McBurney et al. |
| 5,430,451 A | 7/1995 | Kawanishi et al. |
| 5,515,057 A | 5/1996 | Lennen et al. |
| 5,534,875 A | 7/1996 | Diefes et al. |
| 5,608,414 A | 3/1997 | Amore |
| 5,633,645 A | 5/1997 | Day |
| 5,642,122 A | 6/1997 | Lockie et al. |
| 5,818,385 A * | 10/1998 | Bartholomew ............... 342/372 |
| 5,899,957 A | 5/1999 | Loomis |
| 5,917,446 A * | 6/1999 | Greenspan ................... 342/373 |
| 5,952,968 A * | 9/1999 | McDowell ................... 342/383 |
| 6,023,242 A * | 2/2000 | Dixon ......................... 342/359 |
| 6,061,019 A * | 5/2000 | Miyoshi ...................... 342/359 |
| 6,084,540 A * | 7/2000 | Yu .............................. 342/17 |
| 6,166,690 A * | 12/2000 | Lin et al. ................ 342/357.06 |
| 6,178,333 B1 * | 1/2001 | Feuerstein et al. ........... 455/503 |
| 6,377,211 B1 * | 4/2002 | Hsiung ........................ 342/359 |
| 6,512,481 B1 * | 1/2003 | Velazquez et al. ........... 342/367 |
| 2001/0003443 A1 * | 6/2001 | Velazquez et al. ........... 342/367 |
| 2002/0034967 A1 * | 3/2002 | Taniguchi et al. ........... 455/562 |

FOREIGN PATENT DOCUMENTS

WO WO98/16077 A2 4/1998

OTHER PUBLICATIONS

International Search Report dated May 27, 2003; International application No. PCT/US02/21440.

* cited by examiner

*Primary Examiner*—Gregory C. Issing
(74) *Attorney, Agent, or Firm*—Buchanan Ingersoll PC

(57) ABSTRACT

The present invention relates to a method and apparatus for selectively receiving radio frequency (RF) signals which utilizes an array of antenna elements including a center antenna for receiving the RF signal, a navigational controller using coordinate information to determine pointing vectors pointing to respective RF signal sources, and beam-forming electronics connected to the array of antenna elements and the navigational controller for forming reception lobes. Each reception lobe points in the direction of a determined pointing vector. For accurate and precise measurements, a constant phase center is maintained by adjusting the center antenna to the same phase shift for each of the lobes and steering the lobes by adjusting the phase shift of the antenna elements surrounding the center antenna.

73 Claims, 14 Drawing Sheets

INTERFERENCE REJECTION GPS ANTENNA SYSTEM

FIELD OF THE INVENTION

The present invention relates generally to selective reception of radio frequency (RF) signals, such as those of a global positioning system (GPS) which uses satellites to determine location of objects on the earth. More specifically, the present invention relates to selectively receiving signals from GPS satellites using an array of antenna elements.

BACKGROUND OF THE INVENTION

Over the past few years, the global positioning system (GPS) has enjoyed increased attention being utilized in a variety of different applications requiring precise measurement of location on the surface of the earth. Some of the different applications which make use of the GPS data include: location measuring applications, navigation applications, tracking applications, mapping applications, and timing applications.

Signals sent from GPS satellites may be used by location measuring applications to determine latitude and longitude of a receiving device. GPS receivers may be useful for personal recreation such as hiking, kyacking, skiing, or other activities that may require one to venture to remote locations. Location measuring applications may also be used in moving vehicles such as automobiles or airplanes to determine the present location of any such vehicles, thereby preventing the vehicle's operator from becoming lost. Location measuring applications also find a use in the military, where precision location information is important for targeting, location of enemy forces, or personnel location.

Navigation applications making use of GPS data are useful in moving vehicles and for determining the best path to be taken to reach a desired destination. For example, automobiles may incorporate GPS receivers to determine present location, and use this information in connection with known street layout information to determine the fastest, or most fuel efficient path to a desired destination. Similarly, airplanes may use GPS information in navigating to determine travel information or landing and takeoff information. In the military, GPS navigation applications may be useful in maneuvering blindly, such as at night, or without the aid of lights or other instruments.

Tracking applications using GPS information are useful for monitoring the movement of people and things. For example, the military may use GPS tracking applications to monitor the movement of troops and equipment of enemy forces. Emergency response systems may use tracking applications to determine the present location of emergency medical response teams in an effort to minimize the response time of a team reaching a victim at a desired location.

Mapping applications which utilize GPS signals may be used in cartography for creating more accurate maps. Land surveying and marine surveying may also be enhanced by mapping applications which utilize GPS information. In addition, construction and agriculture may both be improved by mapping applications which utilize precision GPS data for aligning buildings or crops more precisely.

Timing applications which utilize signals from GPS satellites may be used to determine precise timing, and to coordinate time with GPS time and/or universal time (UTC) standards. By so doing, applications such as mobile communications may achieve high levels of timing precision by taking advantage of the precise atomic clocks on board the GPS satellites without incurring the high costs of incorporating atomic clocks.

As can be seen from the above, many advantages are enjoyed by applications using GPS signals and data. This data can be obtained from any of the twenty four satellites currently in the GPS constellation. These satellites are placed in orbit such that a minimum of five are in view from every point on the globe at any given time. Many GPS receivers are configured with an almanac, which allows the receiver to determine the present, expected location of each of the GPS satellites.

GPS is, however, a fairly fragile system having a received power at the GPS receiver location of −160 dB or less. Because of the weakness of the signal, signal forces that are much closer to the receiver's location may cause much unwanted interference. For example, a 5W transmitter can cause potential interference signals that stretch for hundreds of miles. There have been documented cases where people have interfered with the signals received by the airlines with a small transmitter, and where television stations have developed intermodulation frequencies and energies in the process of transmitting their signals that have caused interference for aircrafts. As GPS increases in popularity and availability, the possibility of interference from low-powered transmitter devices becomes a greater concern, and affects more people. Also, as more sensitive systems, such as emergency systems and military applications use GPS data, the prospect of interference from low-powered transmitter devices becomes an area of increasing concern.

Systems which have been developed to date generally use a single, nearly uniform-gain antenna with a hemispherical reception pattern for receiving all signals more than a few degrees above the horizon in all directions. Using a single, nearly uniform-gain antenna allows signals from satellites just above the horizon and nearly overhead to be received with nearly equal power. Many of the improvements to GPS receiving systems have focused on the receiver. Efforts have been made to increase receiver sensitivity so that the relatively weak GPS signals may be received clearly from all directions.

Various other systems have employed multiple antenna elements to utilize a technique known as null steering. Null steering is a method whereby the multiple antenna elements are used to provide cancellation and otherwise reject the interference signals. However, even in rejecting interference signals, the signal strength provided by GPS satellites is weak, and consequently may be easily lost by a GPS receiver. This a problem especially in sensitive applications such as emergency situations, military applications or other critical systems like those employed by the airlines.

Therefore, it is desirable to create a system and method for selectively receiving RF signals such as those from GPS satellites by an array of antenna elements in a manner such that the desired signals are additively combined thereby effectively amplified, while interference signals experience no such amplification.

SUMMARY OF THE INVENTION

Accordingly, an embodiment of the present invention provides for an apparatus for selectively receiving radio frequency (RF) signal, which includes an array of antenna elements for receiving the RF signal, a navigational controller for determining a pointing vector from coordinate information, and beam-forming electronics connected to the array of antenna elements and the navigational controller for forming reception lobes. The elements of the antenna array may be dual-frequency patch elements. According to a further embodiment, the beam-forming electronics may form the reception lobes by adjusting the phase of the elements of the antenna array. An antenna output may also be provide from the beam-forming electronics.

According to a further embodiment of the present invention the elements of the antenna array may be arranged in a symmetric configuration, including but not limited to a radially symmetric configuration. The RF signals received by the apparatus, may include signals from at least one global positioning system (GPS) satellite, and the navigational controller may determine a satellite pointing vector. Additionally, the reception lobes formed by the beam-forming electronics may have a width of 25 degrees or less.

According to another embodiment of the present invention, the beam-forming electronics of the apparatus may also have at least one phase shifter connected to the array of antenna elements for shifting the phase of the received RF signals, and a beam-forming algorithm processor connected to the at least one phase shifter and the navigational controller for calculating an amount by which the at least one phase shifter shifts the received RF signals in response to the pointing vector. This at least one phase shifter may optionally be an array of phase shifters, and the beam-forming electronics may also have a means for summing outputs of each phase shifter of the array of phase shifters. Where a means for summing outputs of phase shifters of an array of phase shifters may also have an antenna output of the beam-forming electronics.

In accordance with the further embodiment of the present invention, the output of phase shifters used in an array of phase shifters may constructively amplify selectively received RF signals by an amplification factor by aligning selective reception lobes of each element of the array of antenna elements, while interference signals from undesired sources are combined by the phase shifters in a random manner, such that the interference signals experience essentially no amplification. The constructive amplification may amplify desired, selectively received RF signals by at least 12 dB, while the interference signals may have a strength of −30 dB.

Another aspect of the present invention provides for a navigational controller which includes a receiver for receiving RF signal transmissions conveying absolute position information of an apparatus, an inertial measurement unit (IMU) for measuring changes in relative position of the apparatus, and a navigation processor connected to the receiver, the IMU, and the beam-forming algorithm processor for receiving absolute and relative position information from the receiver and the IMU and calculating the pointing vector from the absolute and relative position information and transmitting the pointing vector to the beam-forming algorithm processor. The receiver may be a GPS receiver, and may contain satellite almanac information comprising location information of satellites. The IMU may be a number of different sensor as measurement units, such as: a vibrational sensor, a gyroscopic sensor, a laser gyroscopic sensor, or an accelerometer. The IMU may also be a micro-machined device. The relative position information measured by the IMU may include changes in velocity and changes in angle. The navigation processor may be connected to a host and may allow for input and output (I/O) communications between the navigation processor and the host. The satellite pointing vector may be updated using a pre-determined refresh rate, which may be 200 Hz. This refresh rate may correspond to an update rate of the reception lobes.

Another embodiment of the present invention is a method for selectively receiving a radio frequency (RF) signal, comprising the steps of: receiving an RF signal using an array of antenna elements: determining a pointing vector from coordinate information; and forming reception lobes of the antenna array to detect RF signal sources in the direction of the pointing vector. In one embodiment the pointing vector may be a satellite pointing vector. The step of determining may be accomplished using actual coordinate information and/or may be accomplished using relative coordinate information. The step of forming the reception lobes may be accomplished by shifting the phase of an RF signal received in the step of receiving. This method for selectively receiving an RF signal may also comprise the steps of: shifting the phase of signals from antenna elements in the array to obtain phase-shifted signals; summing phase-shifted signals obtained in the step of shifting in a manner such that desired RF signals in the direction of the pointing vector are constructively summed, providing an effective amplification of the desired RF signals, while interference RF signals not in the direction of the pointing vector are not effectively amplified due to random shifting of the interference RF signals.

Further features of the invention, and the advantages offered thereby, are explained in greater detail hereinafter with reference to specific embodiments illustrated in the accompanying drawing.

DETAILED DESCRIPTION OF THE PREFERRED EMBODIMENTS

To facilitate an understanding of the principles and features of the present invention, is explained hereinafter with reference to its implementation in an illustrative embodiment. In particular, the invention is described in the context of a method and apparatus for selectively receiving an RF signal, which may be a signal from a GPS satellite. The present invention has particular utility in the GPS environment, as the process of forming of reception lobes using an array of antennal elements allows a receiving unit to selectively receive desired signals, which may be relatively weak, that are transmitted from distant sources, such as GPS satellites, without interference from undesired interference signals transmitted by other sources. It will be appreciated, however, that this is not the only embodiment in which the invention can be implemented. Rather, it can find utility in a variety of computer configurations as will become apparent from an understanding of the principles which underscore the invention.

Figure 1:
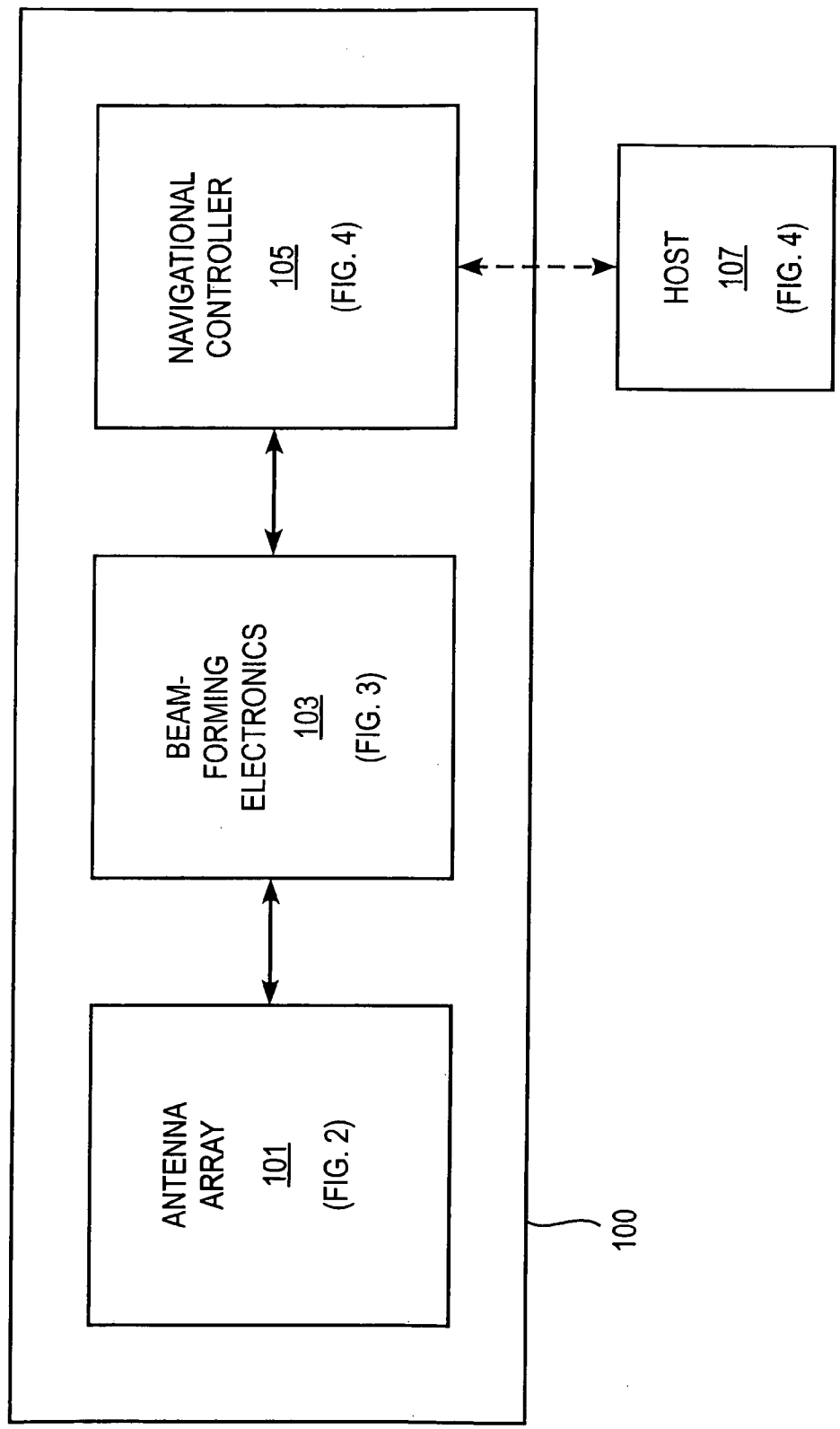
FIG. 1 is a block diagram of one embodiment of the present invention.

An embodiment of the present invention, illustrated in FIG. 1, is an apparatus 100 for selectively receiving an RF signal, comprising an array of antenna elements, or antenna array 101, a navigational controller 105 for determining a pointing vector from coordinate information, and beam-forming electronics 103 connected to the array of antenna elements 101 and the navigational controller 105 for forming reception lobes. As illustrated in FIG. 1 using bi-directional arrows, each component can communicate by means of input and output (I/O) with its neighboring component. For example, in the embodiment illustrated in FIG. 1, the antenna array 101 can send and receive electronic data to and from beam-forming electronics 103. Likewise, beam-forming electronics 103 can send and receive electronic information to and from the antenna array 101, and the navigational controller 105. As illustrated in FIG. 1, a host 107 may optionally be connected to the apparatus 100, and specifically to the navigational controller 105 with a bi-directional communications link for providing I/O electronic information and for optionally providing electronic power. The references to various Figures within the elements of FIG. 1 indicate subsequent Figures in which the various elements may be viewed in greater detail.

Figure 2:
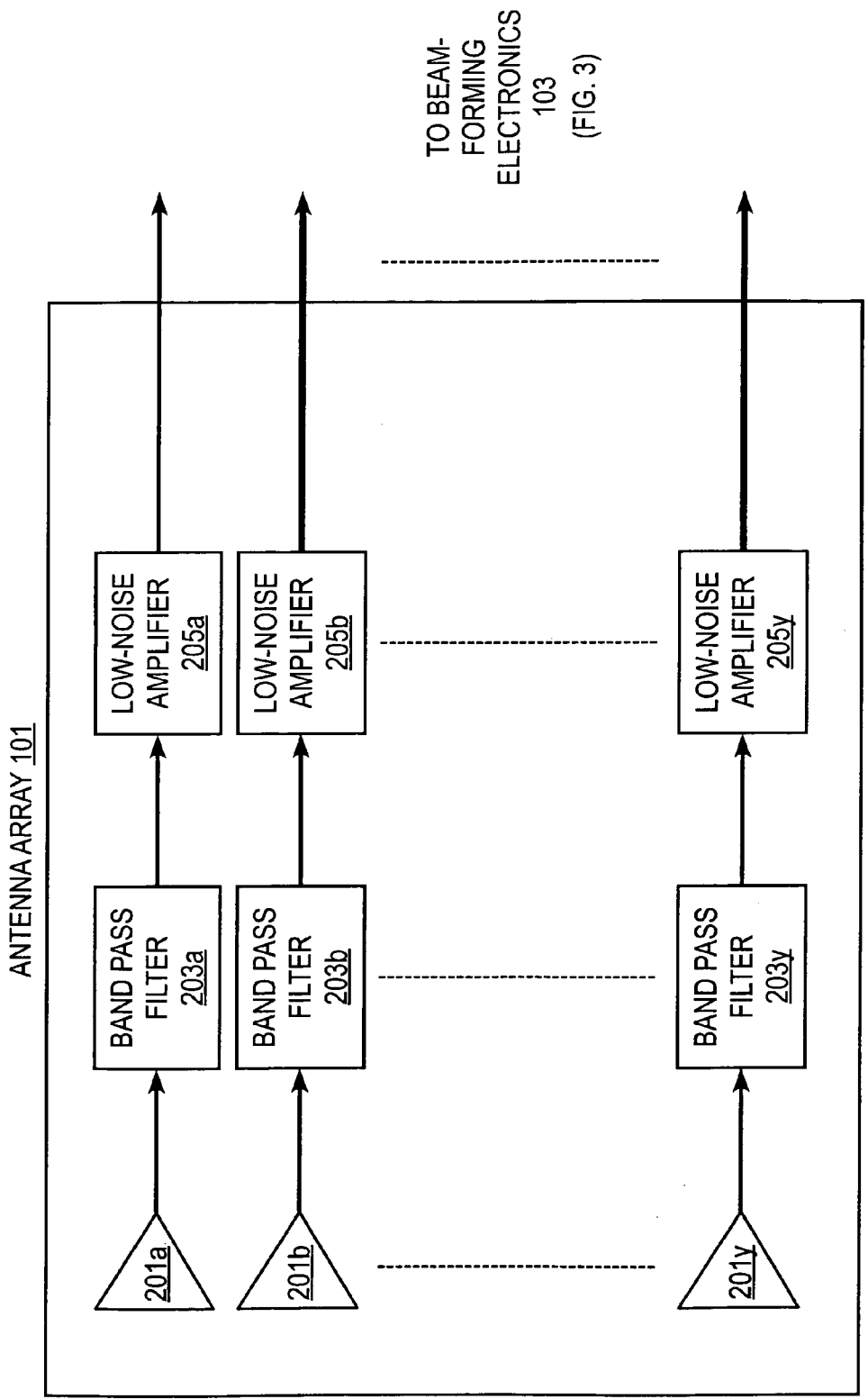
FIG. 2 is a block diagram of an antenna array in accordance with one embodiment of the present invention.

FIG. 2 is a more detailed block diagram of the array of antenna elements, or antenna array 101 of the apparatus 100. Within the antenna array 101, various antenna elements 201 are labeled with lowercase letter designations to indicate numerous antenna elements which are essentially similar to in function, and could possibly be used interchangeably. For example, in FIG. 2 numerous antenna elements are illustrated using the designations 201a–201y. These labels are used to indicate that the antenna array 101 contains 25 antenna elements in this instance, beginning with 201a and ending with 210y. However, it should be recognized by one skilled in the art that the number of antenna elements used in an antenna array 101 could be increased or decreased to obtain different desired functionality and increase control over the reception patterns of the antenna array 101.

The antenna elements 201 could be a variety of different antenna elements, suitable for receiving RF signals. For example, conventional antennas could be used, solid state device antennas could be use, or any other antenna device suitable for receiving desired RF signals could be used. The antenna elements may be dual-frequency antenna elements, according to an embodiment of the present invention. One example of an element 201 of the antenna array 101 is a dual-frequency patch element. All antenna elements 201 could comprise dual-frequency patch elements. The antenna elements 201 may be arranged in a variety of patterns, designed to maximize the desired reception characteristics of the antenna array 101. For example, in one embodiment, the antenna elements 201 could be arranged in a matrix, having a number of rows and columns containing antenna elements 201. This matrix could be symmetric, but does not necessarily need to be. Another example of a configuration that could be used for arranging antenna elements 201 is a radial pattern. For example, a circle or other radial pattern could be used to arrange antenna elements. In one example, the radial pattern of the antenna elements 201 of the antenna array 101 could be arranged such that antenna elements 201 and placed on a circle, radially spaced by an equal number of degrees. If, for example an antenna array 101 is constructed of nine antenna elements 201 it could be arranged such that one antenna element 201 would be placed in the center of a circle of the remaining eight antenna elements 201, which would then be equally spaced on radii of a circle, which are spaced at 45 degree angles from the neighboring radii of the circle. The antenna elements 201 can be arranged in a symmetric configuration, or non-symmetric configuration. It will be appreciated by those skilled in the art, however, that the arrangement patterns and configurations described are not the only configurations in which the antenna elements 201 of the antenna array 101 may be arranged. Rather, a variety of arrangements are intended to be encompassed within the present invention, and would be within the skill of one ordinarily skilled in the art. One skilled in the art will recognize that the arrangement of the antenna elements 201 may be changed and adjusted to modify the receiving characteristics of the antenna array 101.

Also contained with the antenna array 101 is a variety of signal processing electronics for processing the selectively received RF signals. For example, a band pass filter 203 or a series of band pass filters 203a–203y, may be used to filter the frequency characteristics of the RF signal received by the various antenna elements 201. The band pass filter may optionally comprise a dual band pass filter, for example. It will be understood by those skilled in the art that a number of band pass filters may be used, as illustrated in FIG. 2, wherein up to twenty five band pass filters are illustrated corresponding in number to the number of antenna elements illustrated. It will also be recognized by those skilled in the art, however, that the RF signals received by each of the antenna elements 201 may be filtered by a single band pass filter 203.

In addition to a band pass filter for filtering the received RF signal from the antenna elements 201, a low-noise amplifier 205, or low-noise amplifiers 205a–205y, may be used to amplify the filtered RF signal received by the antenna elements 201. As with the band pass filter, it will be recognized that either a single low-noise amplifier 205, or multiple low-noise amplifiers 205a–205y may be used to amplify the filtered signals from each of the antenna elements.

According to an embodiment of the present invention, the antenna elements 201, the band pass filters 203, and the low noise amplifiers 205 may optionally be part of a general GPS unit, or GPS antenna. One such example that could optionally be employed in the present invention is the GPS unit 4G1215P-1000-A available from Anteon, Inc. of California.

After an RF signals received by the antenna elements 201 have been filtered by band pass filters 203, and amplified by low-noise amplifiers 205, it is transmitted to beam-forming electronics 103. A detail of the beam-forming electronics 103 can be seen in FIG. 3.

Figure 3:
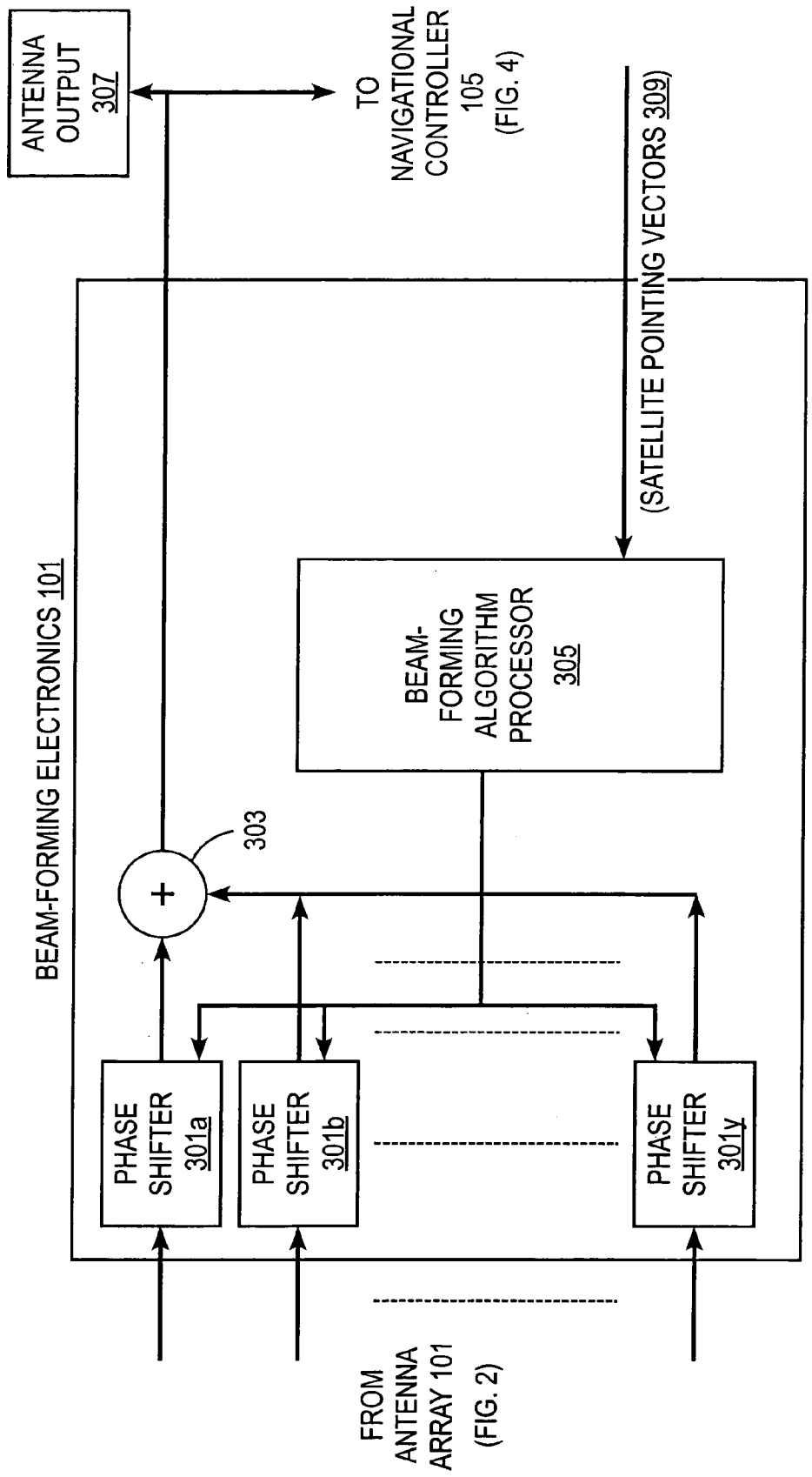
FIG. 3 is a block diagram of beam-forming electronics and antenna output in accordance with one embodiment of the present invention.

In FIG. 3, a block-diagram of beam-forming electronics 103 is illustrated. FIG. 3 indicates that electronic signals are passed to and from the antenna array 101 of FIG. 2, and the navigational controller 105 of FIG. 4 with arrows on the left, and right-hand sides, respectively. The beam-forming electronics 103 are used for forming reception lobes to aid the apparatus 100 and selectively receiving RF signals. The beam-forming electronics may be used to form the reception lobes by adjusting the phase of the antenna elements 201 of the array 101. The beam-forming electronics may also further comprise at least one phase shifter 301 connected to the array of antenna elements 101 for shifting the phase of the received RF signal, and a beam-forming algorithm processor 305 connected to the at least one phase shifter 301, and the navigational controller 105 for calculating an amount by which the at least one phase shifter 301 shifts the received RF signals.

The phase shifter 301 may comprise a single phase shifter or an array of phase shifters 301a–301y. In FIG. 3, the array of phase shifters comprises a number of individual phase shifters 301, which may optionally correspond in number to the number of antenna elements 201. It will be recognized, however, that the number of phase shifters 301 used to shift the phase of the received RF signal may vary. The number of phase shifters 301 used can be varied according to the desired phase-shifted characteristics of the RF signal, as will be recognized by those skilled in the art. In the case of an array of phrase shifters comprising multiple phase shifters 301, the beam-forming electronics 103 may comprise a means for summing 303 outputs of each phase shifter of the array of phase shifters. Alternatively, a phase shifter circuit may be provided for each RF signed to be received. The type of phase shifters used may vary. For example, the phase shifters 301 may comprise digitally controlled delay line style phase shifters.

As illustrated in FIG. 3, the apparatus 100 may further comprise an antenna output 307 from the beam-forming electronics 103. This antenna output 307 may provide phase-shifted antenna signals from the beam-forming electronics 103, allowing a user to receive the phase-shifted signals of the antenna array 101. In the case where an array of phase shifters is used, the antenna output 307 of the apparatus 100 may be from the means for summing 303 outputs of each phase shifter 301a–301y of the beam-forming electronics 103.

The output of the phase shifters 301 constructively amplifies selectively received RF signals by an amplification factor by aligning selective reception lobes of each element 201 of the array of antenna elements 101, while interference signals from undesired sources are combined by the phase shifters 301 in a random manner, such that the interference signals experience essentially no amplification. The constructive amplification amplifies desired, selectively received RF signals by a desired amount, which depends upon the number of antenna elements 201 and the strength of the reception lobes of each element 201 of the array 101. These reception lobes may be aligned and summed by the means for summing 303, or by the phase shifters 301 themselves. While the exact amount of amplification of an RF signal received by the antenna array 101 and processed by the beam-forming electronics 103 is variable and is determined by the various components and electronics of the device, in one embodiment the constructive amplification amplifies desired, selectively received RF signals by at least 12 dB. In so doing, this embodiment causes the interference signals to have a relative strength of −30 dB. It will be apparent, however, to those skilled in the art that constructive amplification of the selectively received RF signals may be varied depending upon the various components and algorithms used to shift the phases of the antenna elements 201 of the antenna array 101. These components and algorithms may be changed according to the reception patterns and characteristics desired.

The beam-forming algorithm processor 305 is connected to the array of phase shifter 301 and the navigational controller 105 for forming reception lobes to selectively receive RF signals. The beam-forming algorithm processor 305, as shown in FIG. 3, is connected to a phase shifter or a phase shifters 301 for calculating an amount by which the phase shifter or phase shifters shift the received RF signals in response to the pointing vector, which is received from the navigational controller 105.

In one embodiment, the RF signal is received by the antenna array 101 may comprise signals from at least one global positioning system (GPS) satellite, and the pointing vector comprises a satellite pointing vector. In this manner, the beam-forming algorithm processor 305, upon receiving the satellite pointing vector or vectors 309, as shown in FIG. 3, is able to adjust the phase of the antenna elements 201 using the phase shifter or phase shifters 301 to allow for constructive amplification of the desired RF signals, in this case signals from at least one GPS satellite. However, it will be recognized by those skilled in the art that GPS satellite signals and satellite pointing vectors are only one type of RF signal and one type of pointing vector that can be used by the present invention for selectively receiving RF signals from remote locations. In calculating the desired reception lobes of the antenna array 101, the beam-forming electronics 103, or more specifically the beam-forming algorithm processor 305 using a pointing vector 309 may design reception lobes of desired width. For example, a reception lo be having a width which is relatively narrow, such as 25 degrees, is advantageous in many environments, as it provides for a narrow reception pattern, thereby eliminating many interference signals from various noise sources outside of that narrow pattern.

Figure 4:
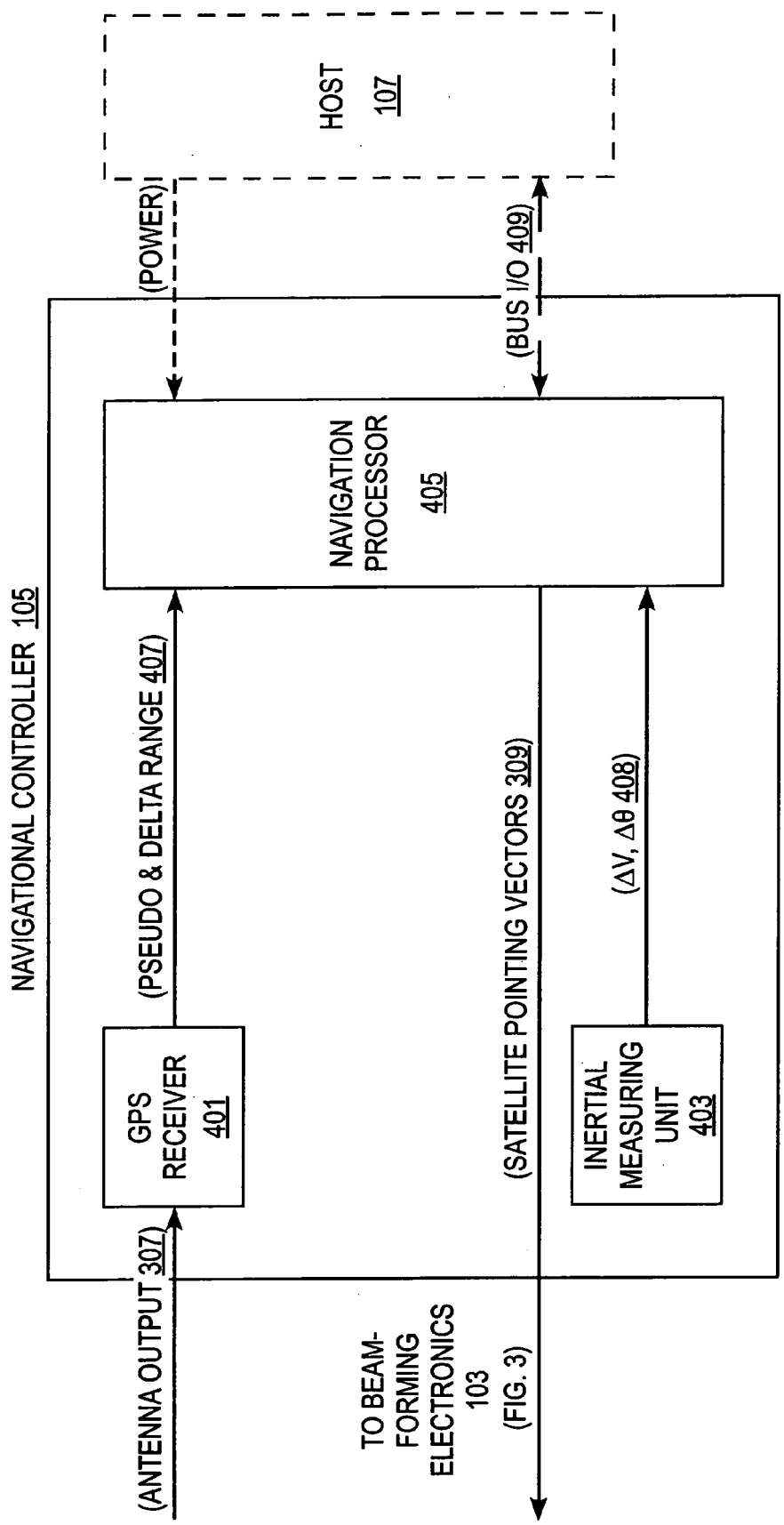
FIG. 4 is a block diagram of a navigational controller and host in accordance with one embodiment of the present invention.

FIG. 4 illustrates a navigational controller 105 used for determining a pointing vector 309 from coordinate information. The block diagram of FIG. 4 illustrates the various components contained within the navigational controller 105, which are meant to be illustrative and not limiting. For example, in FIG. 4 the navigational controller 105 comprises a receiver 401 for receiving RF signal transmissions conveying absolute position information of the apparatus, an inertial measuring unit (IMU) 403 for measuring changes in relative position of the apparatus, and a navigation processor 405 connected to the receiver 401, the IMU 403, and the beam-forming algorithm processor 305 for receiving absolute and relative position information from the receiver 401 and the IMU 403, and calculating the pointing vector 309 from the absolute and relative position information, and transmitting the pointing vector 309 to the beam-forming algorithm processor 305.

In one embodiment, shown in FIG. 4, the receiver 401 comprises a GPS receiver. However, this need not be the case, and those skilled in the art will recognize that the type of receiver may be varied according to the type of RF signal desired to be selectively received. In the case where a GPS receiver 401 is used it may contain satellite almanac information comprising location information of satellites. In this manner, the GPS constellation of all GPS satellites may be used to determine the location (i.e. altitude and azimuth) of each satellite. In this manner, the GPS receiver may be configured to determine which satellites' signals are being received by the receiver 401 by comparing satellites' relative positions to GPS almanac information.

If a GPS receiver is used it may have a large number of channels, for example 36 or 44 to aid the receiver in matching the code from each satellite with a known code. The type of coding used in the signals may be similar to a conventional CDMA-type coding. When the code received by the receiver 401 is matched to a known code, then the receiver 401 knows which satellite most likely is sending the signal. The receiver 401 then may transmit absolute position information, in the form of pseudo and delta range information 407, to the navigation processor 405. This allows the navigation processor 405 to know the positions of the sources of the selectively received RF signals.

To aid the navigation processor further, in providing various offsets of the apparatus, the inertial measuring unit (IMU) 403 measures changes and relative position information 408 of the apparatus. These relative changes may comprise changes in velocity and/or changes in angle of the apparatus. However, other variables, which communicate changes in relative position may be measured by the IMU 403 and conveyed to the navigation processor 405.

The IMU 403 may be one or a combination of a number of acceptable devices for measuring relative changes in position. For example, the IMU 403 may comprise a vibrational sensor, a gyroscopic sensor, a laser gyroscopic sensor, or an accelerometer. These devices may be conventional, or solid-state devices. The IMU 403, in one embodiment, for example, may comprise a micro-machined device. Upon receiving the absolute position information 407, and the relative position information 408, which may comprise changes in velocity, angle, or other measurable changes in position, the navigation processor computes a pointing vector 309, which is transmitted to the beam-forming algorithm processor 305 for determining the amounts by which each phase shifter 301 needs to shift the phase of each antenna element 201 in order to form selective reception lobes, for constructively amplifying, and selectively receiving desired RF signals.

As shown in FIG. 4, the navigation processor may optionally be connected to a host 107. The host may provide a thing such as power to the navigation processor 405, as shown in FIG. 4. The connection with the host 107 may also provide input and output (I/O) communications between the navigation processor 405 and the host 107, as shown with the bi-directional arrow indicating transfer of I/O data 409. The satellite pointing vector may be updated using a predetermined refresh rate. This refresh rate may be varied according to the electronics of the navigation processor 405 and the electronics with the beam-forming algorithm processor 305. Various optimal rates may be used for transmitting this pointing vector 309, depending upon the desired results. In the embodiment illustrated in FIG. 4, the refresh rate is optimally 200 Hz, however, this rate may vary greatly, and may be changed depending upon the design constraints of the apparatus to be used for selectively receiving RF signals. The pre-determined refresh rate may correspond to an update rate of the reception lobes, for selectively receiving RF signals. However, this need not be the case, as the reception lobes could be programmed with different update or refresh rates, which are optimal for the desired application.

Figure 5:
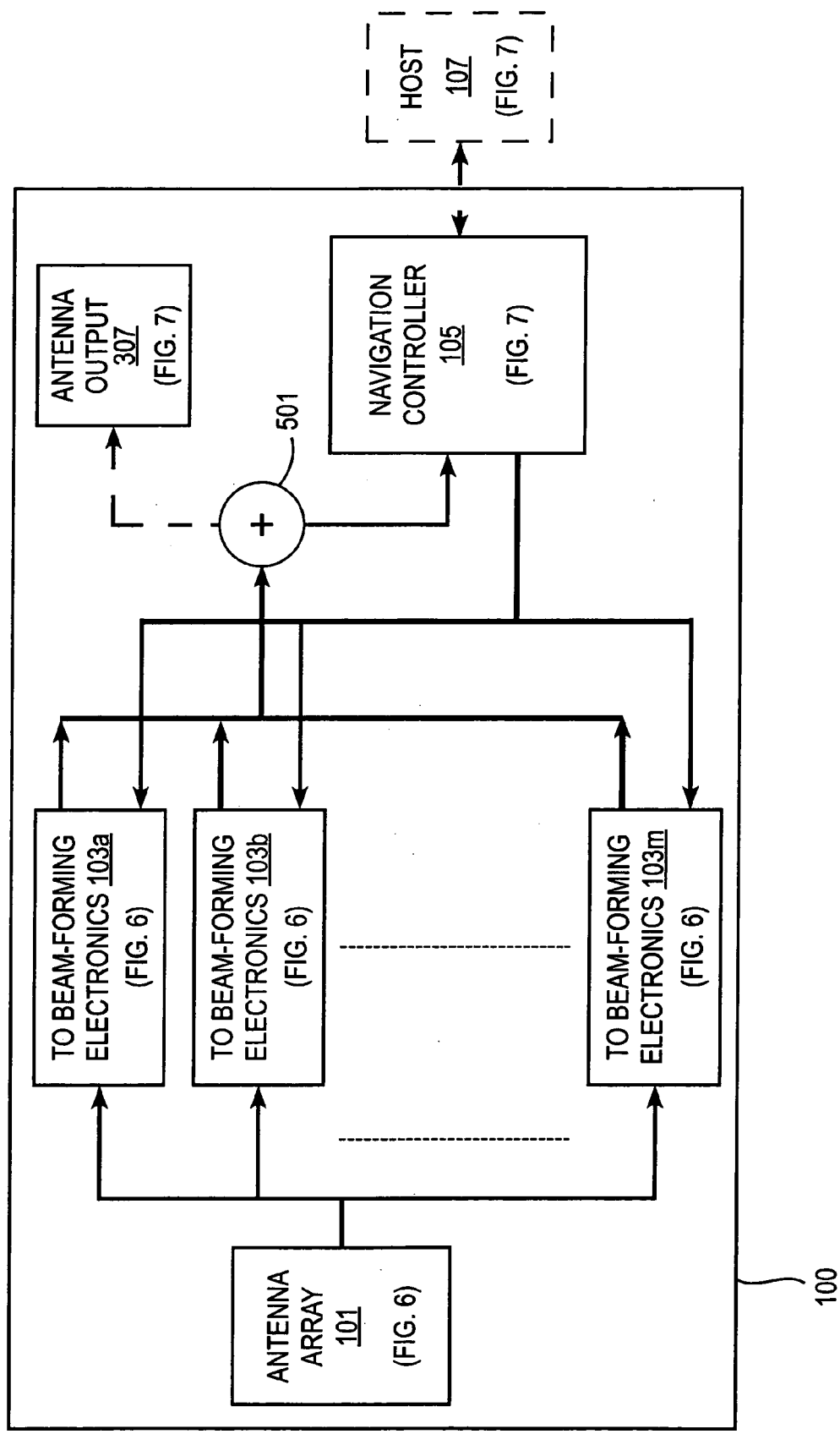
FIG. 5 is a block diagram of one embodiment of the present invention.
Figure 6:
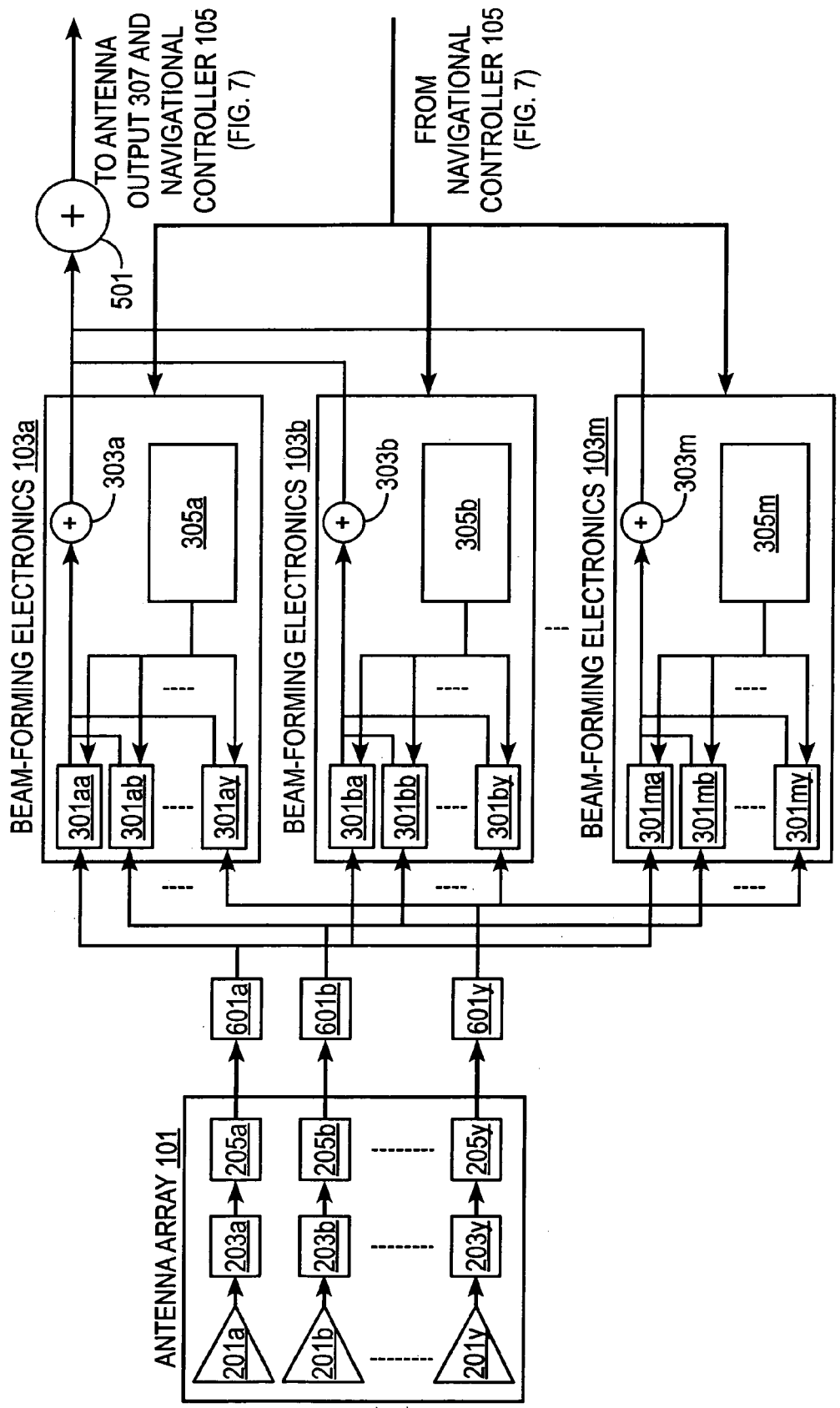
FIG. 6 is a block diagram of an antenna array, splitters, and beam-forming electronics in accordance with one embodiment of the present invention.
Figure 7:
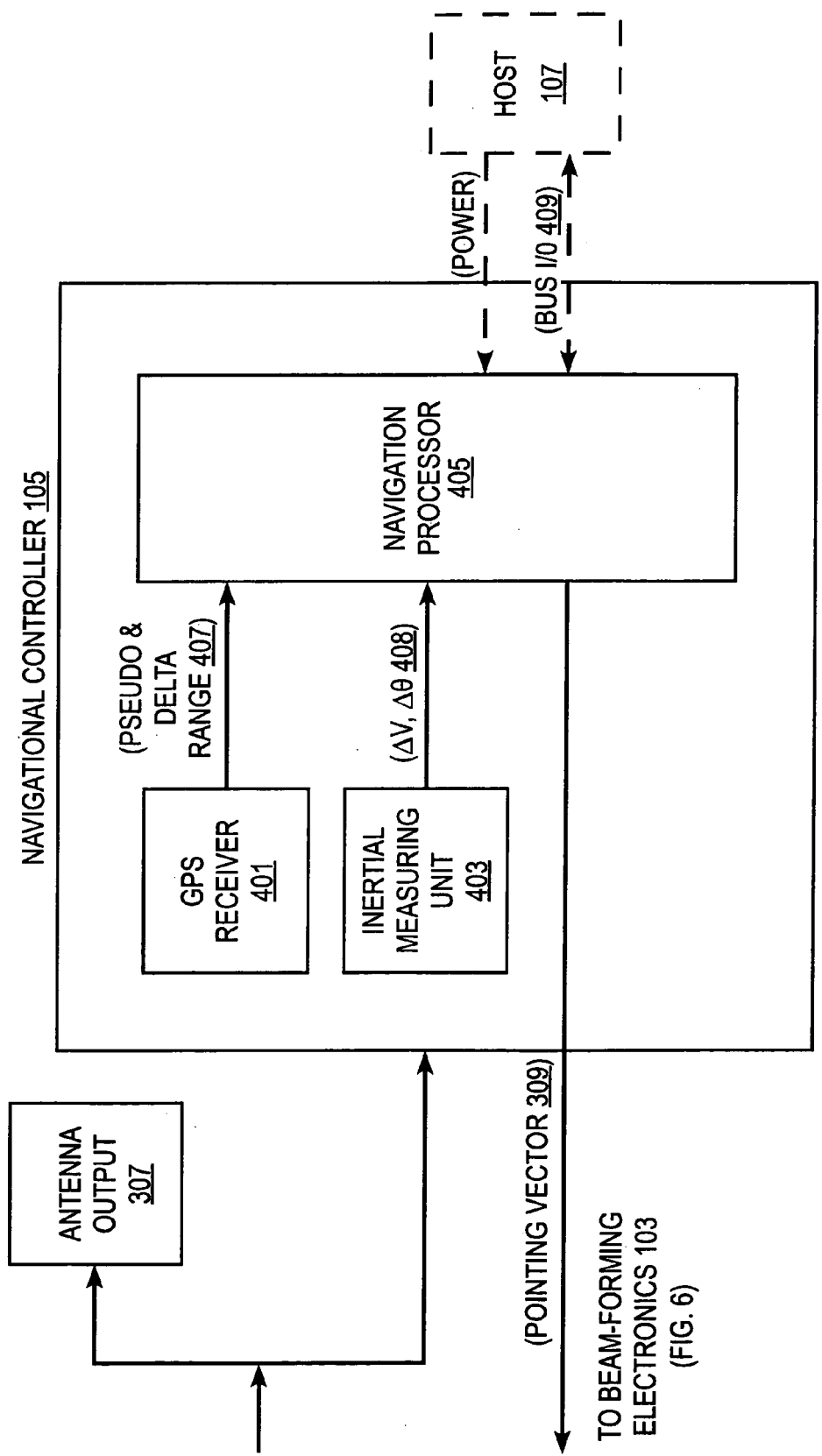
FIG. 7 is a block diagram of antenna output, navigational controller, and host in accordance with one embodiment of the present invention.

FIGS. 5–7 illustrate a different embodiment of the apparatus 100 shown in FIGS. 1–4. The principle difference, as shown in FIG. 5, is that rather than having one beam-forming electronics unit 103, as shown in FIG. 1, the apparatus 100 shown in FIG. 5 has multiple beam-forming electronics 103*a*–103*m*. In one embodiment shown in FIG. 5, 12 beam-forming electronics are provided for. This is because 12 is generally the maximum number of satellites visible in the sky at any time in a GPS satellite system. However, this number may be varied according to the number of sources of RF signals desired to be received at any given time. For example in a GPS satellite system, the number could be varied between 4 and 12. This is because 4 is the minimum number of GPS satellites needed to obtain a good GPS fix, and 12 is generally the maximum number of satellites visible at any given time. However, even though 4 is the minimum number of satellites necessary to obtain a good GPS fix, the more satellites used, the better the fix obtained.

FIG. 5 is similar to FIG. 1, in that an apparatus 100 for selectively receiving RF signals is provided for comprising an array of antenna elements 101 for receiving the RF signal, a navigational controller 105 for determining a pointing vector from coordinate information, and beam-forming electronics 103*a*–103*m* connected to the array of antenna elements 101 and the navigational controller 105 for forming reception lobes. In the embodiment illustrated in FIG. 5, the beam-forming electronics 103 are connected to the navigational controller 105 by way of a means for summing 501. This means for summing 501 accepts the received RF signal information from each of the beam forming electronics 103. The result is then summed and transmitted to the navigational controller 105, and optionally to an antenna output 307. As illustrated in FIG. 5, a host 107 may be optionally connected to a navigational controller 105 for providing power and/or I/O information.

In FIG. 6, the antenna array 101 and beam forming electronics 103 are illustrated in more detail. As with the antenna array 101 illustrated in FIG. 2, the antennal array 101 of FIG. 6 contains numerous antenna elements 201*a*–201*y*. As with the previous embodiment, these antenna elements may be arranged in a variety of manners, including but not limited to a symmetric arrangement in a matrix or radially symmetric form. The received RF signals, received by the antenna elements 201 are transmitted to a band pass filter 203, or band pass filters 203*a*–203*y*. The band pass filter filters the frequency characteristics of the received RF signal received by the antenna element 201. This band pass filter may be a single element, or multiple elements, as illustrated in FIG. 6. The filtered RF signal is passed to a low noise amplifier 205, or a series of low noise amplifiers 205*a*–205*y*. The low noise amplifier amplifies the filtered RF signal. As with the band pass filter, the low noise amplifier may comprise a series of low noise amplifiers, or may be limited to a single low noise amplifier. The amplified signal, or combination of signals transmitted from the low noise amplifier 205 is then passed to a splitter, or series of splitters 601*a*–601*y*. The number of splitters 601 may correspond in number to the number of antenna elements 201. The function of the splitter 601, or series of splitters is to separate the signal from each antenna element into multiple signals to be transmitted to each of the beam-forming electronics 103. Accordingly, the number of outputs from each splitter 601 must correspond in number to the number of beam-forming electronics 103 used.

As illustrated in FIG. 6, each beam-forming electronics 103 contains a series of phase shifters 301. In FIG. 6, the number of phase shifters contained within each beam-forming electronics 103 is twenty-five, which corresponds to the number of antenna elements 201 This is indicated by the numbering scheme, wherein the first phase shifter of the first beam-forming electronics is designated 301aa. The first letter "a" corresponds to the label "a" in beam-forming electronics 103a, thereby indicating to which beam-forming electronics 103a it belongs. The second "a" corresponds to its position within that particular beam-forming electronics 103a. Therefore, phase shifter 301aa corresponds to the first phase shifter of the first beam-forming electronics 103a, and phase shifter 301mb corresponds to the second phase shifter of beam-forming electronics 103m.

In the example illustrated in FIG. 6, the number of phase shifters 301 contained within each beam-forming electronics 103 corresponds to the number of antenna elements 201. Each beam-forming electronics 103 functions to form reception lobes, as described in connection with FIG. 2. The output of each phase shifter within each beam-forming electronics 103 is summed by the means for summing 303, and each of these outputs is subsequently summed by an external means for summing 501. The beam-forming algorithm processor 305 in each beam-forming electronics 103 receives a pointing vector 309 from the navigational controller 105 and transmits information regarding the necessary phase shift to each phase shifter contained within the same beam-forming electronics.

In FIG. 7, the antenna output 307 is shown, which is a sum of the output of each beam-forming electronics 103, provided by the means for summing 501. The navigational controller 105 functions similarly to the navigational controller shown in FIG. 3, in that it contains: a receiver 401 which transmits absolute position information 407 to a navigation processor 405; an IMU 403, which transmits relative position information 408 to the navigation processor 405 in the form of change of velocity, change in angle, or other suitable relative position information elements; and a navigation processor 405. The navigation processor 405 uses this relative and absolute position information to transmit a pointing vector 309 to the beam-forming electronics 103. The beam-forming algorithm processors 305 utilize this pointing vector 309 to adjust the phase shifters 301 and shift the phase of the RF signal received from each antenna element 201 of the antenna array 101 to create a reception lobe in the position of a source of RF signals which are desired to be selectively received. Also illustrated in FIG. 7, is a host 107, which is similar to the host illustrated in FIG. 1 and may provide power to the navigation processor 405. The host 107 may optionally provide I/O information 409 to and from the navigation processor as illustrated by the bi-directional arrow in FIG. 7.

Figure 8:
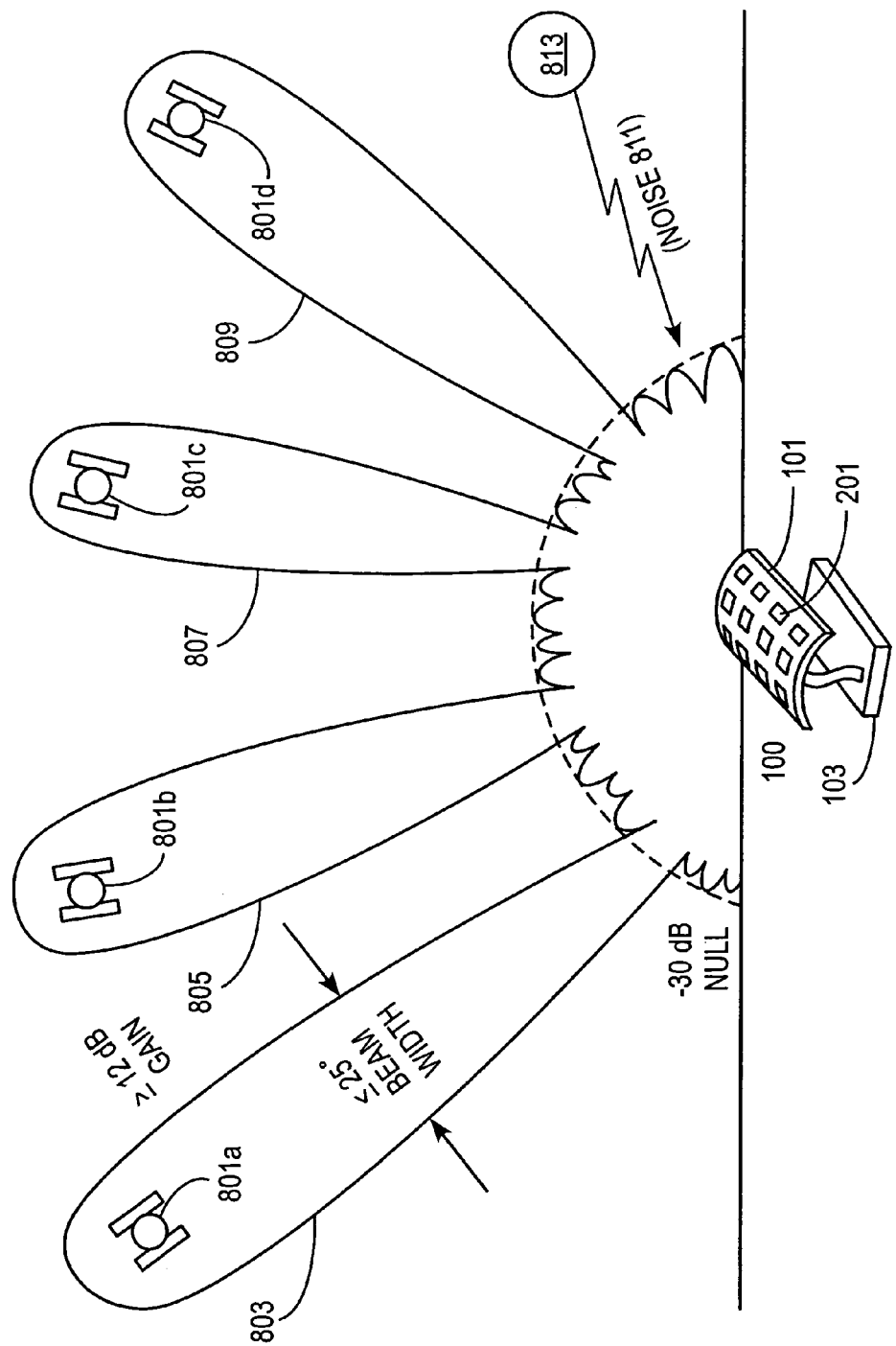
FIG. 8 is a graphical representation of an antenna apparatus in accordance with one embodiment of the present invention.

FIG. 8 illustrates the apparatus 100 in use in a GPS satellite environment. Also illustrated are the beam-forming electronics 103, the antenna array 101, containing antenna elements 201. In FIG. 8, four GPS satellites 801a, 801b, 801c, 801d are illustrated. Reception lobes 803, 805, 807, 809 of the antenna array 101 are illustrated as being selectively receptive to each of the GPS satellites 801. In the embodiment illustrated in FIG. 8, each reception lobe has a gain of greater than or equal to 12 db, and a beam width of 25° or less. The interference signals represented as noise 811 experience no constructive amplification, as the noise source 813 is not contained within the selective reception lobes. Therefore, as illustrated the relative power of the noise 811, or interference signals is approximately minus 30 db.

Figure 9:
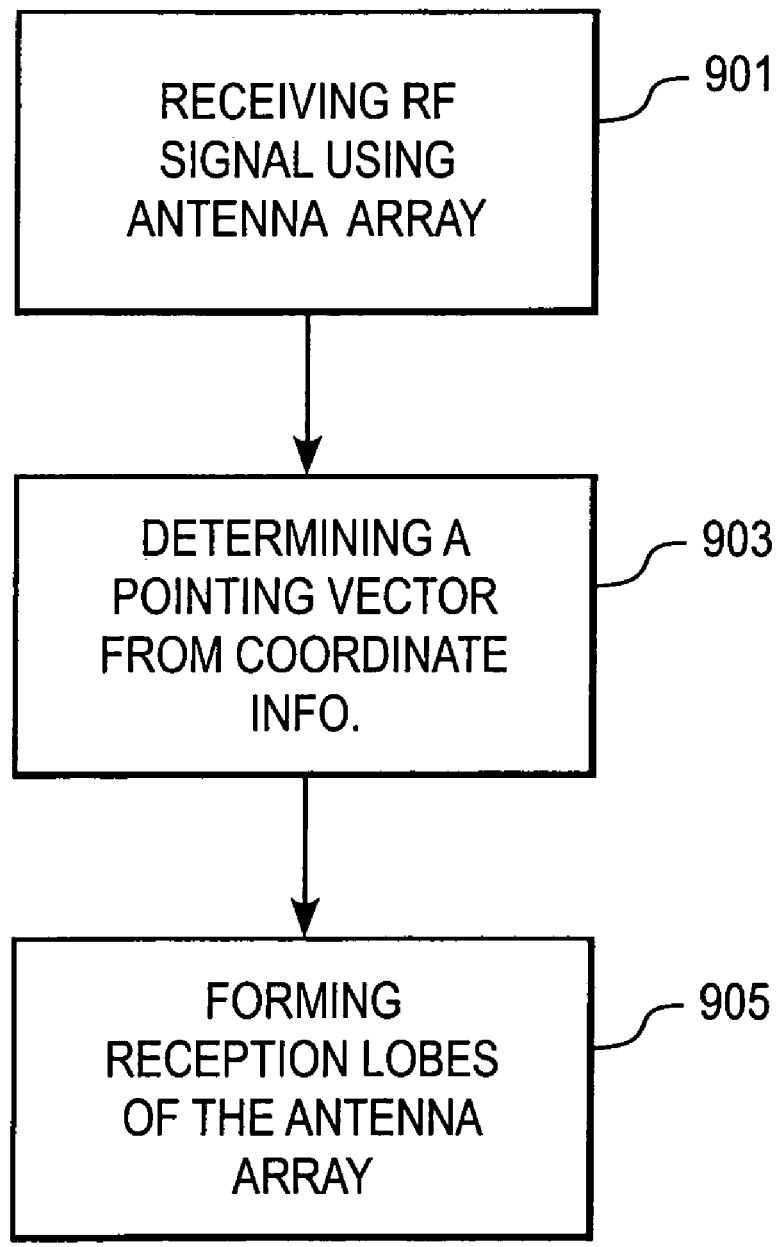
FIG. 9 is a flowchart representation of a method performed by one embodiment of the present invention.

FIG. 9 is a flowchart representation of the method of one embodiment of the present invention. In this method 900 for selectively receiving RF signals, the following steps are involved: receiving 901 an RF signal using an array of antenna elements, determining 903 a pointing vector from coordinate information, and forming 905 reception lobes of the antenna array to detect RF signal sources in the direction of the pointing vector. The pointing vector determined may be a satellite pointing vector in one embodiment of the present invention. The step of determining a pointing vector from coordinate information may be accomplished using either actual coordinate information or relative coordinate information. The step of forming the reception lobes of the antenna array may be accomplished by shifting the phase of an RF signal received in the step of receiving 901.

Figure 10:
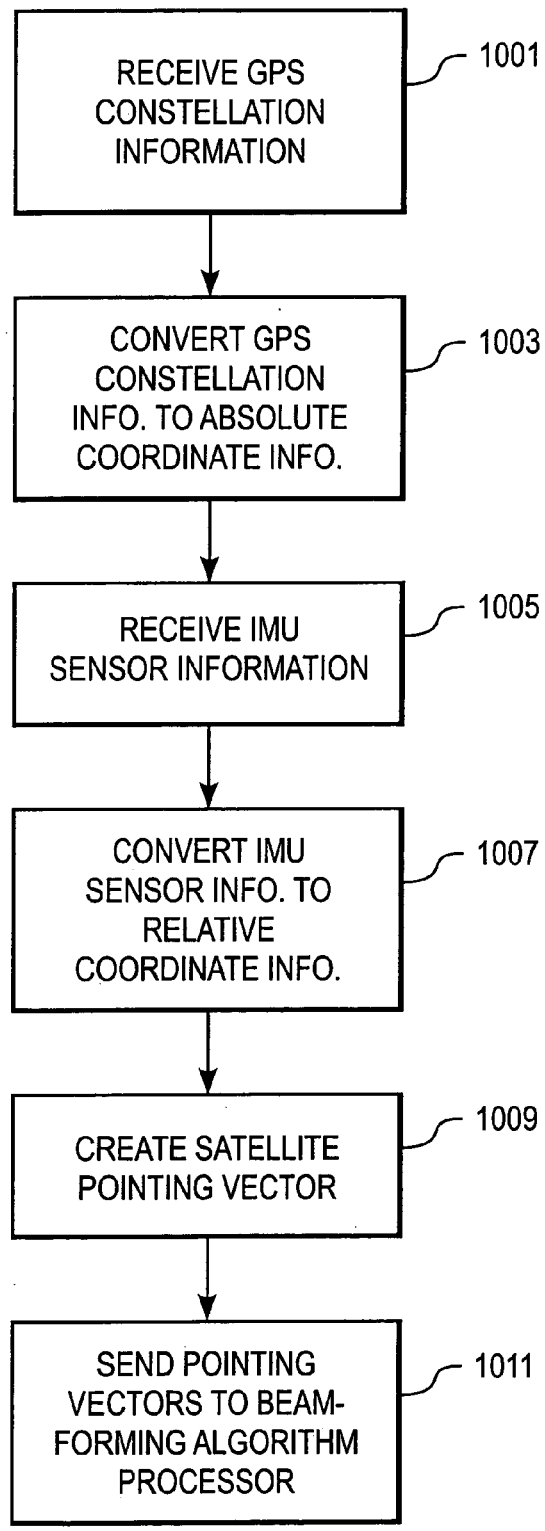
FIG. 10 is a flowchart representation of a method performed by one embodiment of the present invention.

Another embodiment of the present invention is illustrated in the flowchart of FIG. 10. The method 1000 includes receiving 1001 GPS consolation information and converting 1003 the GPS consolation information into absolute coordinate information. The method 1000 also includes receiving 1005 IMU sensor information and converting 1007 IMU sensor information to relative coordinate information. Upon receiving the absolute and relative coordinate information, the method 1000 compares 1009 the absolute and relative coordinate information to create satellite pointing vectors and sends 1011 satellite pointing vectors to the beam-forming algorithm processor.

The present invention, in another embodiment, provides for shifting the phase signals from antenna elements in the array to obtain phase-shifted signals, and summing the phase-shifted signals obtained in the step of shifting in a manner such that desired RF signals in the direction of the pointing vector are constructively summed, providing an effective amplification of the desired RF signals, while interference RF signals not in the direction of the pointing vector are not effectively amplified due to random shifting of the interference RF signals.

Figure 11:
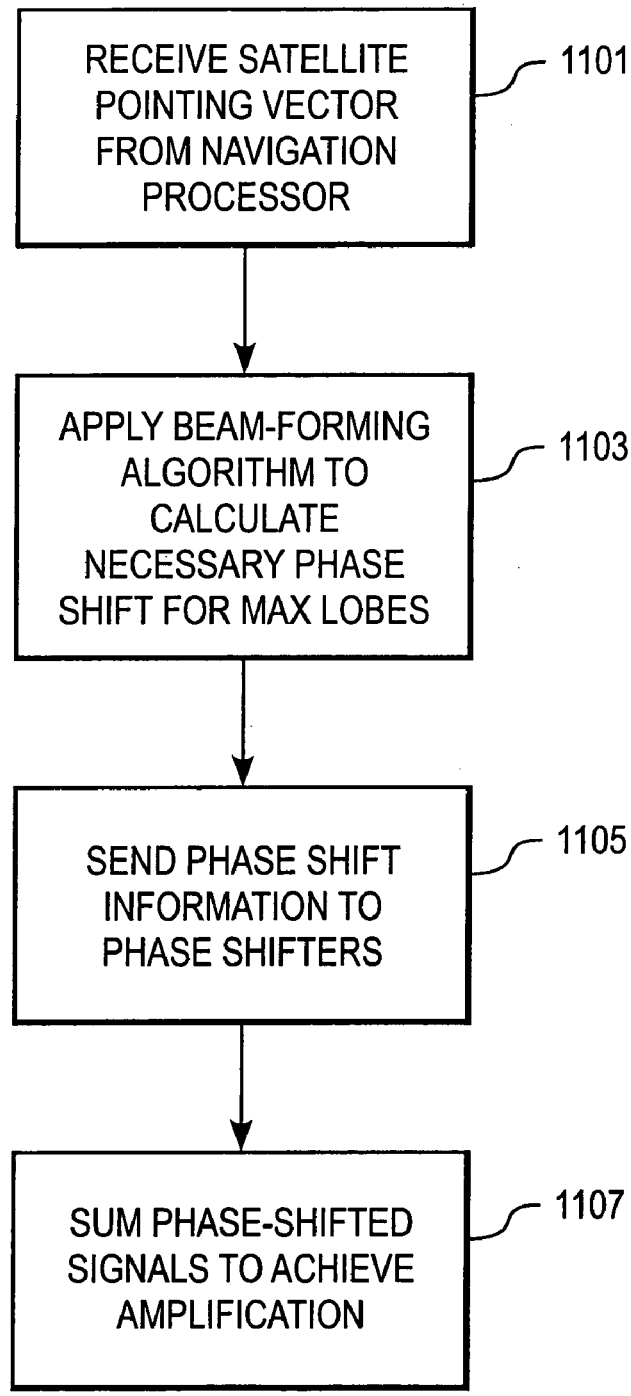
FIG. 11 is a flowchart representation of a method performed by one embodiment of the present invention.

This is illustrated in FIG. 11, where the method 1100 illustrates receiving 1101 satellite pointing vectors from a navigation processor and applying 1103 beam-forming algorithms to calculate necessary phase shifts for maximizing satellite reception lobes. The phase shifts calculated are then sent 1105 to the phase shifter and the phase-shifted signals are summed 1107 to achieve a desired amplification from the array of antenna elements.

Figure 12:
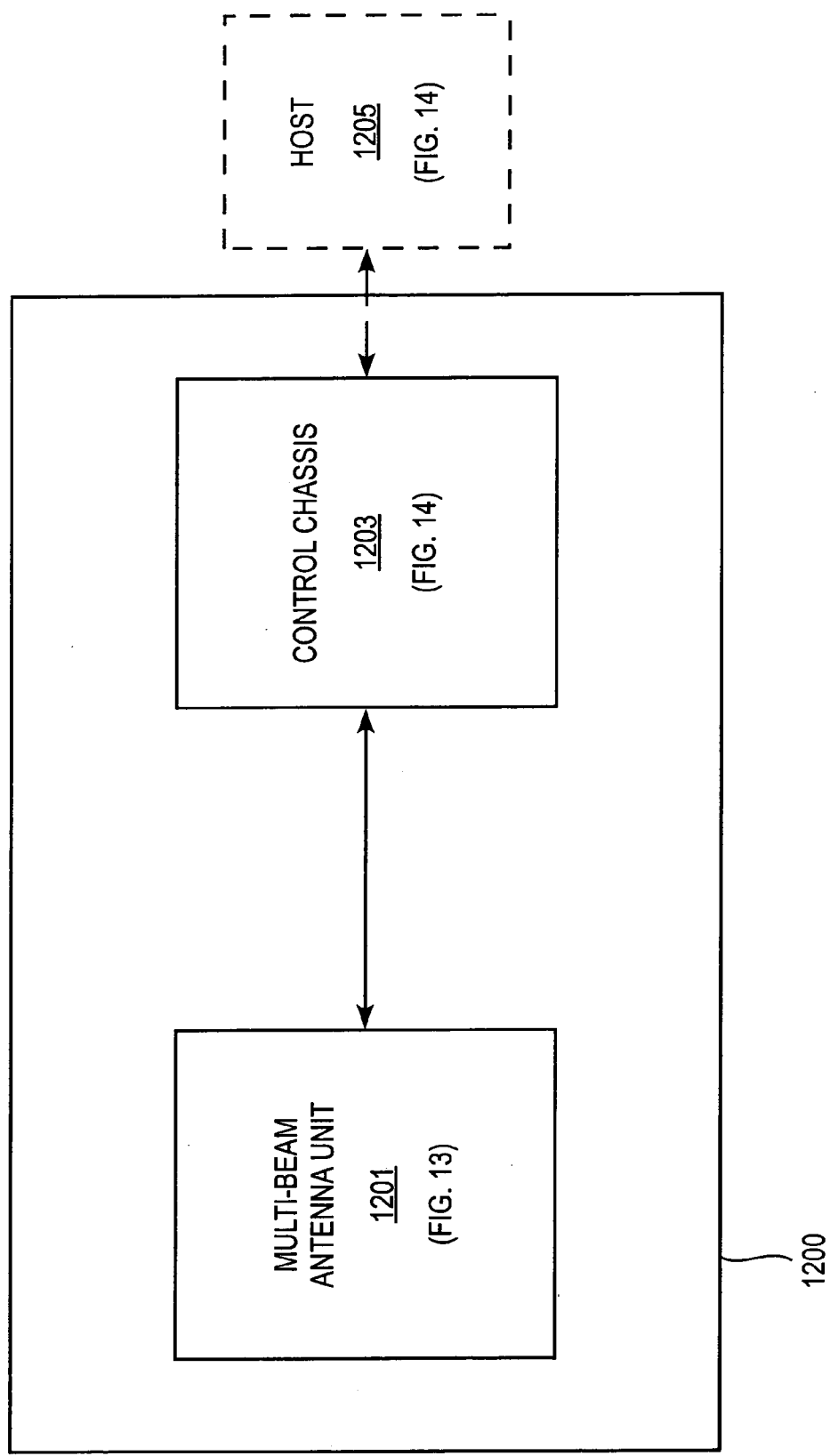
FIG. 12 is a block diagram of one embodiment of the present invention.

In FIG. 12, a system 1200 in accordance with an embodiment of the present invention is illustrated in block diagram form. Within this system, a multi-beam antenna unit 1201 communicates with a control chassis 1203. This embodiment differs from the embodiment illustrated in FIG. 1, as the functionality of the antenna array 101 and the beam-forming electronics 103 are present in the multi-beam antenna unit 1201. The control chassis 1203 is analogous to the navigational controller 105, shown in FIG. 1. As with the embodiment illustrated in FIG. 1, the system 1200 illustrated in FIG. 12 may optionally be connected to the host 1205, as indicated by the broken line in FIG. 12.

Figure 13:
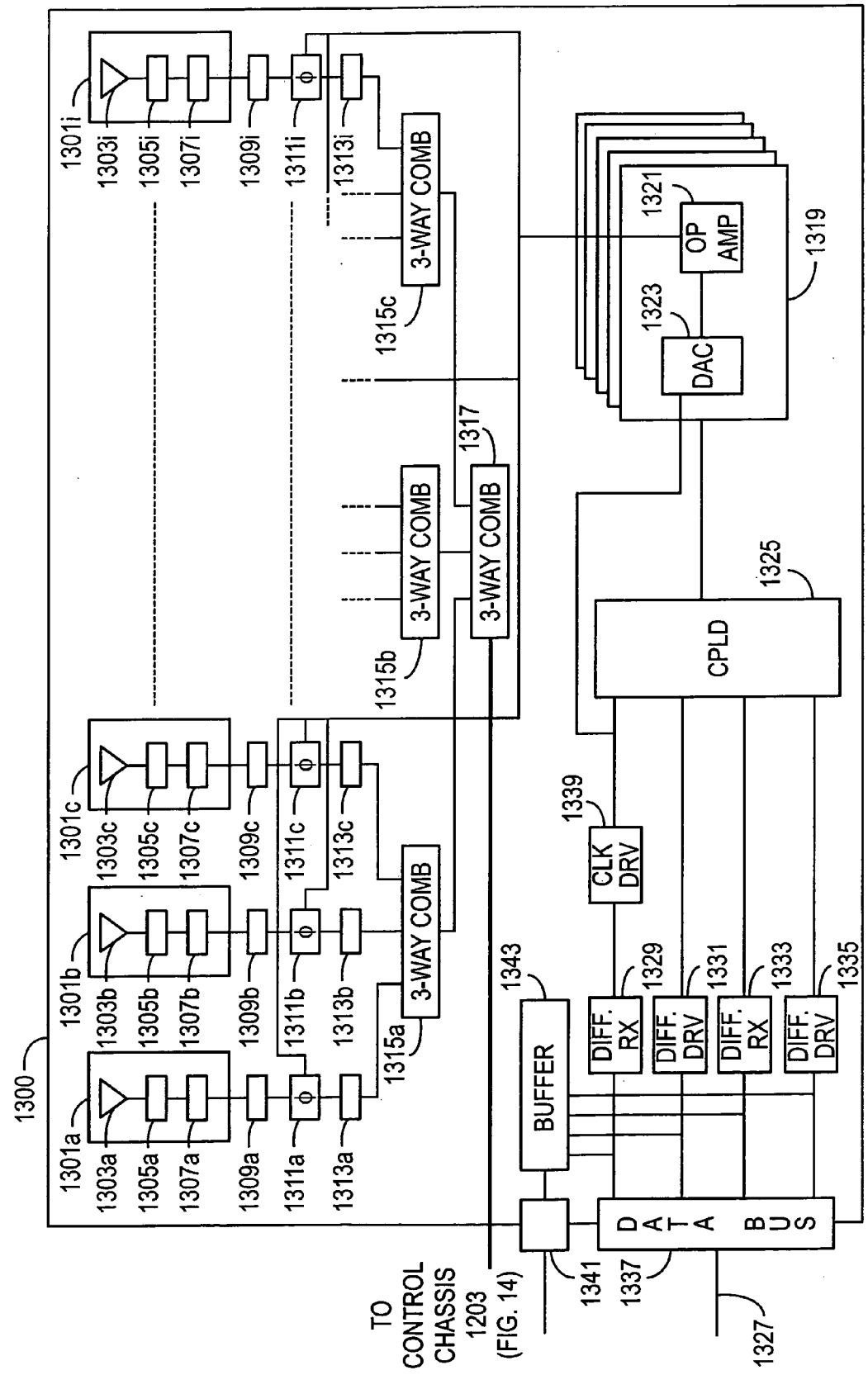
FIG. 13 is a block diagram of a multi beam antenna unit in accordance with one embodiment of the present invention.

FIG. 13 illustrates, in detail, the multi-beam antenna unit 1201 of FIG. 12. In FIG. 13, multiple GPS antenna units 1301a–1301i are illustrated. These GPS antenna units contain an antenna element 1303a–1303i, which in accordance with an embodiment of the present invention may comprise dual frequency antenna elements; a filter 1305a–1305i, which in accordance with an embodiment of the present invention may comprise a dual passband filter; and a linear noise amplifier 1307a–1307i for amplifying the signal received by the antenna elements 1303a–1303i. One GPS antenna that may be suitably incorporated into the embodiment illustrated in FIG. 13 is the GPS antenna element 4T1215P-1000-A available from Antcom Corporation of California.

As previously discussed, the GPS antenna elements 1301a–1301i may be configured to receive signals from multiple satellites. In accordance with an embodiment of the present invention, these multiple signals received from multiple satellites by the GPS antenna elements 1301a–1301i are received as individual signals from the GPS antenna elements by the splitters 1309a–1309i. These splitters 1309a–1309i then split the signal received from the GPS antenna elements 1301a–1301i into the individual signal components received from each satellite. In accordance with an embodiment of the present invention, six individual satellite signals are monitored by each of the GPS antenna elements 1301a–1301i. In such an embodiment, the splitters 1309a–1309i comprise six-way splitters, which divide the signals from each of the GPS antenna elements 1301a–1301i into six, individual signals from each of the six independent satellites being monitored. One six-way divider that may be used in the present invention is the six-way power divider/combiner, part number DS56-0003 from M/A-Com.

Once the signals from the GPS antenna elements 1301a–1301i have been split by the splitters 1309a–1309i, the split signals are then received by the phase shifters 1311a–1311i, which are each capable of processing the number of signals received from the splitters 1309a–1309i in a way so as to shift the phase of each of the individual signals, which can then be combined together in a way such that the signals received from each of the satellites monitored by the GPS antenna elements 1301a–1301g may be effectively amplified. That is, that the signals from each satellite are monitored by the GPS antenna elements 1301a–1301g is added in a constructive manner, such that the satellite signals undergo an effective amplification by way of the constructive addition of each satellite's signal strength. Each phase shifter uses a hybrid loaded vie. Within the phase shifters, varactor diodes are used to produce variable phase shifts as required. The phase shifter design may incorporate a combination of co-planar and micro-strip transmission lines in series with each phase shifter to compensate for the effect caused by shifting the phase of two different frequencies with the same shifter.

The distance between any two dual frequency antenna elements, such as the GPS antenna elements 1301a–1301i, is different. The combination phase shift circuit of the hybrid and transmission lines keeps the pointing angles of each of the GPS antenna elements matched. A center antenna, contained within a patch of GPS antenna elements, is adjusted to the same phase shift for each of the six beams. Beam steering is a accomplished by adjusting the phase shift of the surrounding eight elements. This technique maintains a constant phase center for the array, which is a requirement for accurate and precise carrier phase GPS measurements that can be made by way of the present invention. One suitable phase shifter circuit that may be used as the phase shifter 1311a–1311i is a hybrid coupler, part number HF-1500-1000-E from EMC Technologies of Australia.

Once the signals from each of the GPS antenna elements have been phase shifted by way of the phase shifters 1311a–1311i, the combiners 1313a–1313i are used to recombine the signals into a single signal for each of the GPS antenna elements 1301a–1301i. The same six-way power divider/combiner from M/A-Com that was used as the splitters 1309a–1309i may be used as the combiners 1313a–1313i.

A series of three-way combiners 1315a–1315c are used to combine signals from groups of three GPS antennas. That is, in FIG. 13, the signals received from GPS antenna elements 1301a, 1301b, 1301c are each summed by the three-way combiner 1315a. In accordance with the embodiment of the present invention illustrated in FIG. 13, there are nine GPS antenna elements 1301a–1301i, which are summed in groups of three by three-way combiners 1315a–1315c, and the three signals from these three combiners are then combined by an identical three-way combiner 1317 to form a single output signal. It will be recognized by those skilled in the art that the number of GPS antenna elements, and consequently, the number of combiners necessary to combine the signals of all of the GPS antenna elements into a single signal may vary. Additionally, the number of signals which can be combined by each of the combiners may vary according to the operational parameters of the individual combiners used. A suitable three-way combiner that may be used in the embodiment illustrated in FIG. 13 is the three-way power divider/combiner, part number PDML-30A-1100 from Merrimac Industries, Inc. of New Jersey. The single signal when produced is passed to the control chassis 1203, which is illustrated in detail in FIG. 14.

Each of the phase shifters 1311a–1311i are powered by phase shifter drive circuits 1319. Each of these drive circuits is biased with a DC voltage that is derived from a digital signal converted to DC and amplified. Each of the phase shifter drive units contains an operational amplifier 1321 and a digital-to-analog converter 1323. The operational amplifier 1321 may comprise the operational amplifier OP492TS of Analog Devices of Massachusetts. The digital-to-analog converter (DAC) used in the phase shifter drive circuit may comprise the eight-bit DAC, part number AD8820AR from Analog Devices of Massachusetts.

Figure 14:
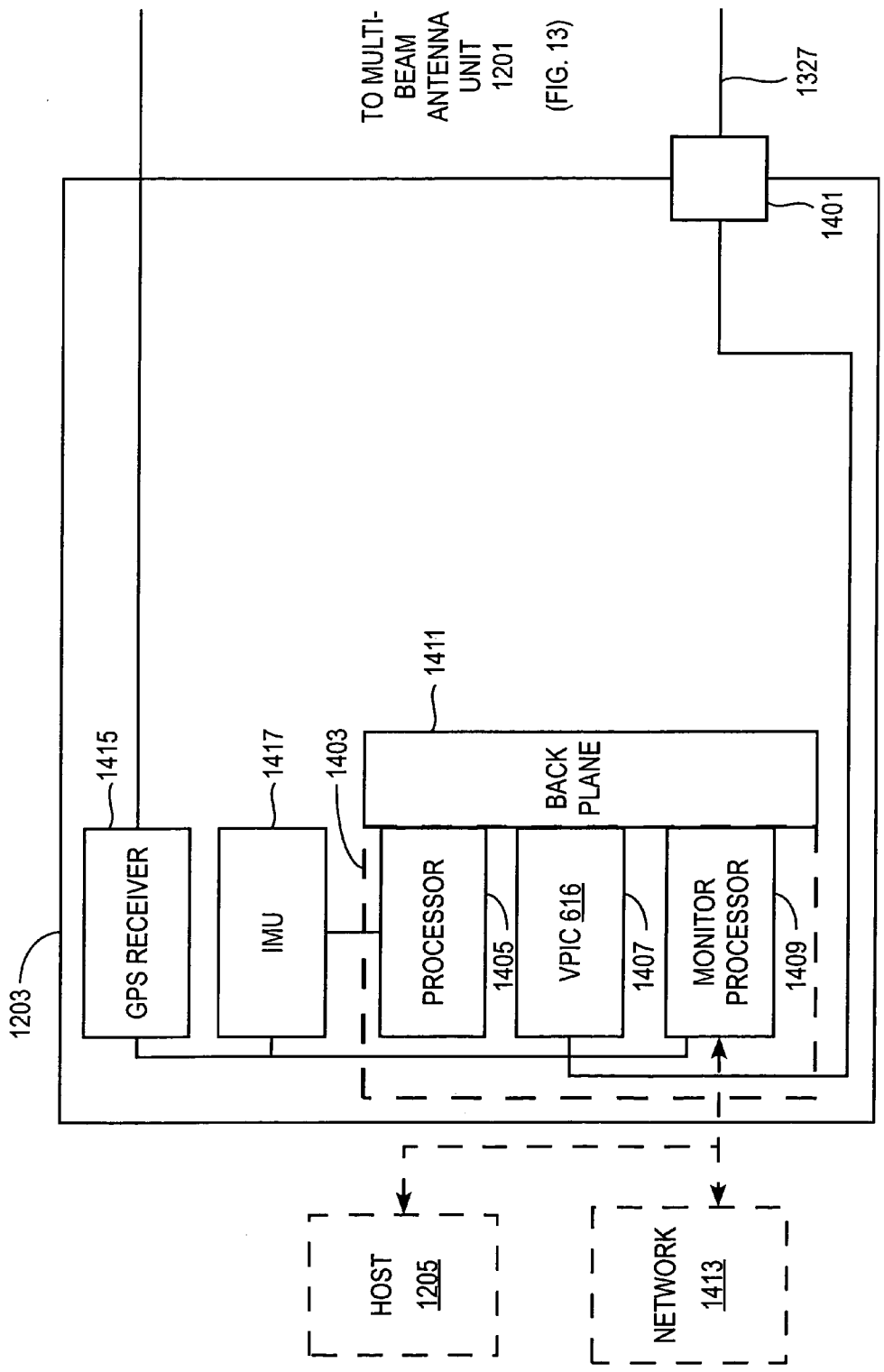
FIG. 14 is a block diagram of a control chassis in accordance with one embodiment of the present invention.

The circuit programmable logic device (CPLD) 1325 receives serial data generated from within the control chassis 1203 of FIG. 14 to control the phase shifters, and distributes the proper signal to each of the phase shifter drive circuits. This information is then used to properly drive phase shifters 1311a, 1311g. Such data is received by way of communications channel 1327 from the control chassis 1203 of FIG. 14. The CPLD may comprise part number IC-CPDL CY37128100-100AI from Cypress Corporation of California.

Communication from the control chassis is received by way of the communication line 1327, which is facilitated by way of a various differential receivers 1329, 1333, and differential drivers 1331, 1335. The differential receivers 1329, 1333 may comprise, for example, the line receiver SN75175D of Texas Instruments, Inc. The differential drivers may comprise, for example, the line driver SN75174DW of Texas Instruments, Inc. These differential receivers and drivers are connected by way of the communication line 1327 to the control chassis 1203 shown in FIG. 14 by way of the data bus 1337. Additionally, a clock driver 1339 is provided to supply the clock signal for the CPLD 1325 and the digital-to-analog converter 1323. This clock driver 1339 is in communication with differential receiver 1329. Also provided for the convenience of the user is a test connection 1341, which allows a user to check the operating status of the various differential receivers 1329, 1333, and differential drivers 1331, 1335 by way of information received via the buffer 1343. Additionally, though not shown, power supply connections may be provided within the multi-beam antenna unit 1201, which may provide power to the operational amplifiers of the antenna elements, the operational amplifiers of the phase shifter drive circuits, and all of the other components contained within the multi-beam antenna unit 1201.

In FIG. 14, the control chassis 1203 is illustrated. This control chassis 1203 is optionally connected to a host 1205, which allows for control and monitoring of the components within the control chassis 1203 and a direct link to the processor of the control chassis 1203. The communication line 1327 is connected to the control chassis 1203 by way of the data bus 1401. A processing unit 1403 is contained within a control chassis 1203, and is in communication with the multi-beam unit 1201 by way of communication channel 1327. This processing unit contains a processor 1405, an input/output (I/O) card 1407, and a monitoring processor 1409. All of these components are connected in the processing unit 1403 by way of the virtual machine environment (VME) back plane 1411. The processor 1405 computes the phase shift required for each phase shifter based on the satellite selected in the GPS constellation and their geometry with respect to the multi-beam antenna unit. One suitable processor that may be used as the processor 1405 is the power PC, part number MVME2600-2 of Motorola, Inc. of Illinois. Alternatively, other suitable processors could be used to accomplish the same functionality. The monitoring processor 1409 may optionally be connected to the host 1205, or a network 1413, such as an ethernet network, or other such network. The purpose of the connection between the monitoring processor 1409 and host 1205 or network 1413 is to allow for monitoring, and control of the processing unit 1403 by way of a host console 1205, or remotely by way of the network 1413, such as an Ethernet network.

A GPS receiver 1415 is in communication with the multi-beam antenna unit, and specifically with the signal combined by the series of three way combiners 1315a, 1315b, 1315c, 1317. This GPS receiver receives and decodes the RF signal from the GPS satellites, and communicates this information to the processing unit 1403 by way of the monitoring processor 1409. The performance of the GPS receiver may be highly dependent on signal to noise (SNR) and RF signal strength. One suitable GPS receiver that may be used as the GPS receiver 1415 of the present invention is the GPS receiver part number 800149-00C of Ashtech, a divisional of Magellan Corporation of Virginia.

An inertial measurement (IMU) 1417 is contained with the control chassis 1203, and is in communication with the processing unit 1403 by way of the processor 1405. The IMU provides information regarding the changes in relative orientation and position of the antenna to enable the processor to compute steering updates, thereby enabling the reception lobes of the antenna array to track targets independent of changes to the antenna orientation and position. One example of a suitable IMU that could be used as the IMU 1417 of the present invention is the precise miniature inertial measurement unit part number 34204725-001 available from Honeywell International, Inc.

The control chassis 1203 would also contain power supply units to provide power for the various components contained therein. Specifically, the GPS receiver, IMU, and processing unit 1403 would all require power, which will be provided by way of various power supplies either internal or external to the control chassis 1203.

It will be appreciated by those of ordinary skill in the art that the present invention can be embodied in other specific forms without departing from the spirit or essential characteristics thereof. For example, the invention has been described in the context of GPS satellite detection. However, the present invention is equally well suited to being employed to receive RF signals selectively from sources using an antenna array and shifting the phase of the elements of the antenna array to achieve a constructive amplification, while no such amplification is experienced by interference signals such as noise. Additional utility may be found in other analogous fields, such as differential GPS, etc. Furthermore, while the presently disclosed embodiment of the present invention have incorporated a combination of analog and digital components, it is anticipated that the present invention will also be implemented in a fully digital system. Such a digital system is intended to be encompassed by the present invention.

The presently disclosed embodiments are, therefore, considered in all respects to be illustrative and not restrictive. The scope of the invention is indicated by the appended claims, rather than the foregoing description, and all changes that come within the meeting and range of equivalents thereof are intended to be embraced therein.

What is claimed is:

1. Apparatus for selectively receiving radio frequency (RF) signals, comprising:
   an array of antenna elements for receiving the RF signals, said array including a center antenna and a group of antenna elements surrounding the center antenna;
   a navigational controller for determining pointing vectors, each vector pointing to a respective source of a received RF signal, from coordinate information; and
   beam-forming electronics connected to the array of antenna elements and the navigational controller for forming a reception lobe in the direction of each pointing vector, wherein a phase center for the array of antenna elements is maintained by adjusting the center antenna to a same phase shift for each of the reception lobes.

2. The apparatus of claim 1, wherein the elements of the array comprise dual-frequency patch elements.

3. The apparatus of claim 1, wherein the beam-forming electronics form the reception lobes by adjusting the phase of the elements of the array.

4. The apparatus of claim 1, further comprising an antenna output from the beam-forming electronics.

5. The apparatus of claim 1, wherein the elements of the array are arranged in a symmetric configuration.

6. The apparatus of claim 1, wherein the elements of the array are arranged in a radially symmetric configuration.

7. The apparatus of claim 1, wherein the RF signals comprise signals from at least one global positioning system (GPS) satellite and the pointing vector comprises a satellite pointing vector.

8. The apparatus of claim 1, wherein the reception lobes have a width of 25 degrees or less.

9. The apparatus of claim 1, wherein said beam-forming electronics comprises:
   at least one phase shifter connected to the array of antenna elements for shifting the phase of the received RF signal; and
   a beam-forming algorithm processor connected to the at least one phase shifter and the navigational controller for calculating an amount by which the at least one phase shifter shifts the received RF signals in response to the pointing vector.

10. The apparatus of claim 9, wherein the at least one phase shifter comprises an array of phase shifters.

11. The apparatus of claim 10, wherein said beam-forming electronics comprises a means for summing outputs of each phase shifter of the array of phase shifters.

12. The apparatus of claim 11, further comprising an antenna output from said means for summing outputs of each phase shifter, of the beam-forming electronics.

13. The apparatus of claim 9, wherein the output of the phase shifters constructively amplifies selectively received RF signals by an amplification factor by aligning selective reception lobes of each element of the array of antenna elements, while interference signals from undesired sources are combined by the phase shifters in a random manner, such that the interference signals experience essentially no amplification.

14. The apparatus of claim 13, wherein the constructive amplification amplifies desired, selectively received RF signals by at least 12 dB.

15. The apparatus of claim 13, wherein the interference signals have a strength of −30 dB.

16. The apparatus of claim 1, wherein the navigational controller comprises:
 a receiver for receiving RF signal transmissions conveying absolute position information of the apparatus;
 an inertial measurement unit (IMU) for measuring changes in relative position of the apparatus; and
 a navigation processor connected to the receiver, the IMU, and the beam-forming algorithm processor for receiving absolute and relative position information from the receiver and the IMU, and calculating the pointing vector from the absolute and relative position information, and transmitting the pointing vector to the beam-forming algorithm processor.

17. The apparatus of claim 16, wherein the receiver comprises a GPS receiver.

18. The apparatus of claim 17, wherein the GPS receiver contains satellite almanac information comprising location information of satellites.

19. The apparatus of claim 16, wherein the IMU comprises a vibrational sensor.

20. The apparatus of claim 16, wherein the IMU comprises a gyroscopic sensor.

21. The apparatus of claim 20, wherein the gyroscopic sensor comprises a laser gyroscopic sensor.

22. The apparatus of claim 16, wherein the IMU comprises an accelerometer.

23. The apparatus of claim 16, wherein the IMU is a micro-machined device.

24. The apparatus of claim 16, wherein the relative position information comprises a change in velocity.

25. The apparatus of claim 16, wherein the relative position information comprises a change in angle.

26. The apparatus of claim 1, wherein the navigation processor is connected to a host.

27. The apparatus of claim 26, wherein the connection with the host provides input and output (I/O) communications between the navigation processor and the host.

28. The apparatus of claim 1, wherein the pointing vector is updated using a pre-determined refresh rate.

29. The apparatus of claim 28, wherein refresh rate is 200 Hz.

30. The apparatus of claim 28, wherein the refresh rate corresponds to an update rate of the reception lobes.

31. A method for selectively receiving radio frequency (RF) signals, comprising the steps of:
 receiving RF signals using an array of antenna elements including a center antenna and a group of antenna elements surrounding said center antenna;
 determining pointing vectors from coordinate information, each pointing vector pointing to a source of one of the received RF signals; and
 forming a reception lobe in the direction of each pointing vector, wherein the center antenna is adjusted to a same phase shift for each reception lobe to maintain a phase center for the array of antenna elements.

32. The method of claim 31, wherein the step of determining pointing vectors determines a satellite pointing vectors.

33. The method of claim 31, wherein the step of determining is accomplished using actual coordinate information.

34. The method of claim 31, wherein the step of determining is accomplished using relative coordinate information.

35. The method of claim 31, wherein the step of forming the reception lobes is accomplished by shifting the phase of an RF signal received in the step of receiving.

36. The method of claim 31, further comprising the steps of:
 shifting the phase of signals from antenna elements in the array to obtain phase-shifted signals; and
 summing the phase-shifted signals obtained in the step of shifting in a manner such that desired RF signals in the direction of each pointing vector are constructively summed, providing an effective amplification of the desired RF signals, while interference RF signals not in the direction of the pointing vectors are not effectively amplified due to random shifting of the interference RF signals.

37. Apparatus for selectively receiving radio frequency (RF) signals, comprising:
 an array of antenna elements for receiving RF signals, said array including a center antenna and a group of antenna elements surrounding the center antenna;
 a navigational controller comprising:
  an inertial measurement unit (IMU) for measuring changes in relative position of the apparatus; and
  a processor for determining pointing vectors based at least in part on coordinate information and the measured changes, wherein each said vector points to a source of a respective received RF signal; and
 beam-forming electronics connected to the array of antenna elements and the navigational controller for forming a reception lobe of the antenna array for each determined pointing vector, wherein a phase center for the array of antenna elements is maintained by adjusting the center antenna to a same phase shift for each lobe.

38. The apparatus of claim 37, wherein the elements of the array comprise dual-frequency patch elements.

39. The apparatus of claim 37, wherein the beam-forming electronics form the reception lobes by adjusting the phase of the elements of the array.

40. The apparatus of claim 37, further comprising an antenna output from the beam-forming electronics.

41. The apparatus of claim 37, wherein the elements of the array are arranged in a symmetric configuration.

42. The apparatus of claim 37, wherein the elements of the array are arranged in a radially symmetric configuration.

43. The apparatus of claim 37, wherein the RF signals comprise signals from at least one global positioning system (GPS) satellite and the pointing vectors comprise a satellite pointing vectors.

44. The apparatus of claim 37, wherein each reception lobe has a width of 25 degrees or less.

45. The apparatus of claim 37, wherein said beam-forming electronics comprises:
 at least one phase shifter connected to the array of antenna elements for shifting the phase of the received RF signals; and a beam-forming algorithm processor connected to the at least one phase shifter and the navigational controller for calculating an amount by which the at least one phase shifter shifts the received RF signals in response to the pointing vector.

46. The apparatus of claim 45, wherein the at least one phase shifter comprises an array of phase shifters.

47. The apparatus of claim 46, wherein said beam-forming electronics comprises a means for summing outputs of each phase shifter of the array of phase shifters.

48. The apparatus of claim 47, further comprising an antenna output from said means for summing outputs of each phase shifter, of the beam-forming electronics.

49. The apparatus of claim 45, wherein the output of the phase shifters constructively amplifies selectively received RF signals by an amplification factor by aligning selective reception lobes of each element of the array of antenna elements, while interference signals from undesired sources are combined by the phase shifters in a random maimer, such that the interference signals experience essentially no amplification.

50. The apparatus of claim 49, wherein the constructive amplification amplifies desired, selectively received RF signals by at least 12 dB.

51. The apparatus of claim 49, wherein the interference signals have a strength of −30 dB.

52. The apparatus of claim 37, wherein the navigational controller further comprises a receiver for receiving RF signal transmissions conveying absolute position information of the apparatus.

53. The apparatus of claim 52, wherein the navigation processor is connected to the receiver and the IMU, determines a pointing vector by way of a calculation based on the actual and relative position information, and transmits the pointing vector to the beam-forming algorithm processor.

54. The apparatus of claim 52, wherein the receiver comprises a GPS receiver.

55. The apparatus of claim 54, wherein the GPS receiver contains satellite almanac information comprising location information of satellites.

56. The apparatus of claim 37, wherein the IMU comprises a vibrational sensor.

57. The apparatus of claim 37, wherein the IMU comprises a gyroscopic sensor.

58. The apparatus of claim 57, wherein the gyroscopic sensor comprises a laser gyroscopic sensor.

59. The apparatus of claim 37, wherein the IMU comprises an accelerometer.

60. The apparatus of claim 37, wherein the IMU is a micro-machined device.

61. The apparatus of claim 37, wherein the relative position information comprises a change in velocity.

62. The apparatus of claim 37, wherein the relative position information comprises a change in angle.

63. The apparatus of claim 37, wherein the navigation processor is connected to a host.

64. The apparatus of claim 63, wherein the connection with the host provides input and output (I/O) communications between the navigation processor and the host.

65. The apparatus of claim 37, wherein the pointing vector is updated using a pre-determined refresh rate.

66. The apparatus of claim 65, wherein refresh rate is 200 Hz.

67. A method for selectively receiving radio frequency (RF) signals, comprising the steps of:
receiving the RF signals using an antenna array having a center antenna;
determining actual coordinate information from information conveyed by the RF signals;
sensing at least one change between an inertial reference frame and a reference frame of the antenna;
determining relative coordinate information based on the sensed changes;
determining pointing vectors from the actual and the relative coordinate information, each said pointing vector pointing in the direction of a source one of the RF signals; and
for each pointing vector, forming a reception lobe in a direction of the pointing vector, wherein the center antenna is adjusted to a same phase shift for each reception lobe to maintain a phase center for the antenna.

68. The method of claim 67, wherein the step of determining pointing vectors determines a satellite pointing vectors.

69. The method of claim 67, wherein the received RF signals are transmitted from a global positioning system (GPS) satellite.

70. The method of claim 67, wherein the step of forming the reception lobe is accomplished by shifting the phase of an RF signal received in the step of receiving.

71. The method of claim 67, wherein a pointing vector is determined for different sources of the received RF signals, and the step of forming a reception lobe includes forming a reception lobe for each of the different RF sources.

72. The method of claim 71, wherein each of the plurality of RF signals sources corresponds to a different GPS satellite.

73. The method of claim 67, further comprising the steps of:
shifting the phase of signals from antenna elements in the array to obtain phase-shifted signals; and
summing the phase-shifted signals obtained in the step of shifting in a manner such that desired RF signals in the direction of each pointing vector are constructively summed, providing an effective amplification of the desired RF signals, while interference RF signals not in the direction of the pointing vectors are not effectively amplified due to random shifting of the interference RF signals.

* * * * *

UNITED STATES PATENT AND TRADEMARK OFFICE
Certificate

Patent No. 7,009,557 B2                          Patented: March 7, 2006

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Richard Kirchofer, Cocoa, FL (US); Raymond Nielsen, Orlando, FL (US); and Arleigh B. Baker, Longwood, FL (US).

Signed and Sealed this Seventeeth Day of February 2009.

THOMAS H. TARCZA
*Supervisory Patent Examiner*
Art Unit 3662